United States Patent
Gao et al.

(10) Patent No.: US 12,047,643 B2
(45) Date of Patent: Jul. 23, 2024

(54) METHOD FOR SWITCHING VIDEO CALL INTERFACE ON SMART TELEVISION, AND SMART TELEVISION

(71) Applicant: JUHAOKAN TECHNOLOGY CO., LTD., Qingdao (CN)

(72) Inventors: Kun Gao, Qingdao (CN); Haoran Sun, Qingdao (CN); Guangqiang Wang, Qingdao (CN)

(73) Assignee: JUHAOKAN TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 17/350,806

(22) Filed: Jun. 17, 2021

(65) Prior Publication Data
US 2021/0314659 A1    Oct. 7, 2021

Related U.S. Application Data

(63) Continuation of application No. PCT/CN2020/091742, filed on May 22, 2020.

(30) Foreign Application Priority Data

Jun. 10, 2019  (CN) .................. 201910497755.X
Mar. 18, 2020  (CN) .................. 202010185290.7

(51) Int. Cl.
*H04N 21/443*  (2011.01)
*H04N 21/4788*  (2011.01)

(52) U.S. Cl.
CPC ..... *H04N 21/4438* (2013.01); *H04N 21/4788* (2013.01)

(58) Field of Classification Search
CPC ........... H04N 21/4438; H04N 21/4788; H04N 21/4312; H04N 21/4223; H04N 7/14; H04N 7/141
See application file for complete search history.

(56) References Cited

U.S. PATENT DOCUMENTS

| | | | |
|---|---|---|---|
| 9,363,472 B2* | 6/2016 | Rowe ................ | H04N 7/15 |
| 2009/0119725 A1 | 5/2009 | Park et al. | |
| 2013/0342629 A1* | 12/2013 | North .............. | H04N 21/44008 348/E7.078 |
| 2015/0045073 A1* | 2/2015 | Koo .................. | H04M 1/6041 455/566 |

(Continued)

FOREIGN PATENT DOCUMENTS

| | | |
|---|---|---|
| CN | 101860494 A | 10/2010 |
| CN | 101958966 A | 1/2011 |

(Continued)

*Primary Examiner* — Nathan J Flynn
*Assistant Examiner* — Christine A Kurien
(74) *Attorney, Agent, or Firm* — ANOVA LAW GROUP, PLLC

(57) ABSTRACT

Disclosed is a method for processing a video call on a smart television and a smart television. In the method, a first call interface displayed in a full screen is switched to a second call interface displayed in a floating layer, and a call window on the second call interface is configured not to be able to obtain a focus; and when a user operates a frontend page, the call window on the second call interface will not be selected, however, all buttons or options of the frontend page located underlying the second call interface can be selected by the user.

12 Claims, 12 Drawing Sheets

(56) References Cited

U.S. PATENT DOCUMENTS

2017/0099456 A1\* 4/2017 Tang .................. H04L 12/1827

FOREIGN PATENT DOCUMENTS

| CN | 102158764 A | 8/2011 |
| CN | 103841342 A | 6/2014 |
| CN | 105635625 A | 6/2016 |
| CN | 105872831 A | 8/2016 |
| CN | 105872832 A | 8/2016 |
| CN | 108012182 A | 5/2018 |

\* cited by examiner

METHOD FOR SWITCHING VIDEO CALL INTERFACE ON SMART TELEVISION, AND SMART TELEVISION

CROSS-REFERENCE TO RELATED APPLICATIONS

The present application is a continuation application of International Application No. PCT/CN2020/091742 filed May 22, 2020, which claims priority to Chinese Patent Application 201910497755.X filed Jun. 10, 2019 and Chinese Patent Application No. 202010185290.7 filed Mar. 18, 2020. The entire disclosures of the above applications are incorporated herein by reference.

FIELD

The present disclosure relates to the technical field of television software, and in particular to a method for switching a video call interface on a smart television and a smart television.

BACKGROUND

This section provides background information related to the present disclosure which is not necessarily prior art.

With the development of Android-based smart television systems and the popularity of cameras, microphones and other devices externally connected to televisions, it is possible to make a video call on a smart television. Since there are many activities that may be carried out on the smart television, e.g., watching videos, playing chess and card games and learning in education applications. If the smart television is only used for the video call, it will cause a waste of resources.

Therefore, there is a need to develop other entertainment scenes on the smart television while making the video call on the smart television.

SUMMARY

This section provides a general summary of the disclosure, and is not a comprehensive disclosure of its full scope or all of its features.

According to a first aspect, some embodiments of the present disclosure provide a method for switching a video call interface on a smart television, including:
while a video call is being displayed on a first call interface displayed in a full screen, receiving an input operation on a small window switch control on the first call interface, and generating an instruction for switching a full screen to a small window; and
in response to the instruction for switching the full screen to the small window, switching the first call interface to a second call interface displayed in a form of a floating layer, and displaying a television interface before accepting the video call in a video layer below a second call interface, where the television interface before the video call is configured to be able to obtain a focus, a call window on the second call interface is configured not to be able to obtain a focus, and a size of the call window on the second call interface is smaller than a size of the call window on the first call interface.

According to a second aspect, some embodiments of the present disclosure provide a method for switching a video call interface on a smart television, including:

receiving a preset key value transmitted from a remote controller;
while a second video call window is displayed in a floating layer, in response to the preset key value, canceling the second video call window, and displaying, in a full screen in a video layer, a first call interface including a first video call window, where the first video call window and the second video call window are both used to display image data of the video call; and
while the second video call window is not displayed in the floating layer, in response to the preset key value, displaying a preset interface corresponding to the preset key value, where the preset interface is different from the first call interface.

According to a third aspect, some embodiments of the present disclosure provide a method for switching a video call interface on a smart television, including:
while a first video is being played on a video layer, in response to a call invitation message, displaying a call invitation interface on a floating layer above the video layer, where the call invitation interface includes an invitation accepting control and an invitation declining control;
receiving a user's operation on the invitation accepting control;
displaying a video call on a first call interface in a full screen, where the first call interface includes a first video call window arranged on the video layer and used for displaying image data of the video call, and a control arranged on the floating layer, where the control includes a small window switch control;
receiving a user's operation on the control; and
controlling to cancel the first call interface, displaying the image data of the video call in a second video call window of a second call interface on the floating layer, and continuing to play the first video on the video layer, where a position except for a region of the second video call window on the second call interface is set to be transparent, and the second call interface is configured that a focus cannot be obtained.

According to a fourth aspect, some embodiments of the present disclosure provide a method for switching a video call interface on a smart television, including:
in response to a call invitation message, displaying a call invitation interface above a current interface, where the call invitation interface includes an invitation accepting control and an invitation declining control;
in response to receiving an operation on the invitation accepting control, answering a video call, and displaying the video call on a first call interface in a full screen, where the first call interface includes an end-call control and a small window switch control;
receiving a key value transmitted from a remote controller, and in response to the video call currently being displayed in a full screen, generating an instruction for switching a full screen to a small window; and
in response to the instruction for switching the full screen to the small window, switching the first call interface in a full screen to a second call interface in the form of a floating layer, and displaying a television interface before the video call below the second call interface, where the television interface before the video call is configured to be able to obtain a focus, a call window on the second call interface is configured not to be able to obtain a focus, and the call window on the second call interface is obtained by reducing the call window on the first call interface according to an area ratio.

According to a fifth aspect, some embodiments of the present disclosure provide a smart television, including a display; and a controller; where the controller is configured for:

receiving an input operation on a small window switch control on a first call interface, and generating an instruction for switching a full screen to a small window, where the first call interface is displayed in a full screen on a video layer and has a call window for a video call; and in response to the instruction for switching the full screen to the small window, canceling the first call interface, displaying a television interface before the video call on the video layer, and displaying a second call interface including a call window on a first floating layer above the video layer to make a video call, where the video layer is configured to be able to obtain a focus, and the second call interface is configured not to be able to obtain a focus.

According to a sixth aspect, some embodiments of the present disclosure provide a smart television, including: a display; and a controller; where the controller is configured for:

receiving a preset key value transmitted by a remote controller;

when it is determined that a second call interface is currently displayed, in response to the preset key value, canceling the second call interface displayed on a first floating layer and a television interface, before a video call, displayed on a video layer, and displaying a first call interface on the video layer, where the first call interface and the second call interface both include a video window for the video call; and when it is determined that the second video call window is not currently displayed, in response to the preset key value, displaying a preset interface corresponding to the preset key value, where the preset interface is different from the first call interface.

According to a seventh aspect, some embodiments of the present disclosure provide a smart television, including: a display; and a controller; where the controller is configured for:

while a first video is being played on a video layer, in response to a call invitation message, displaying a call invitation interface on a floating layer above the video layer, where the call invitation interface includes an invitation accepting control and an invitation declining control;

receiving a user's operation on the invitation accepting control;

displaying a video call on a first call interface in a full screen, where the first call interface includes a first video call window arranged on the video layer and used for displaying image data of the video call, and a control arranged on the floating layer, where the control includes a small window switch control;

receiving the user's operation on the small window switch control; and controlling to cancel the first call interface, displaying the image data of the video call in a second video call window of a second call interface on the floating layer, and continuing to play the first video on the video layer, where a position except for a region of the second video call window on the second call interface is set to be transparent, and the second call interface is configured that a focus cannot be obtained.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
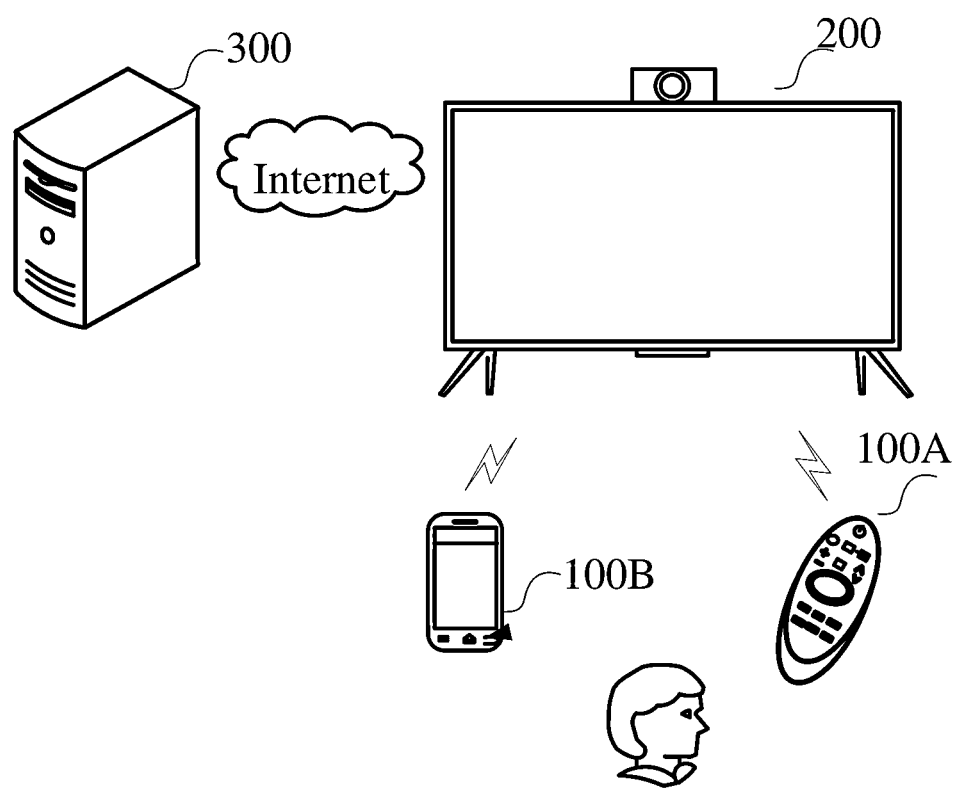
FIG. 1 illustrates a schematic diagram of an operation scenario between a display device and a control device according to an embodiment.

Example embodiments will now be described more fully with reference to the accompanying drawings.

For convenience of use for a user, generally, various external device interfaces are arranged on a display device to facilitate connecting different peripheral devices or cables to achieve corresponding functions. When a high-definition camera is connected to an interface of the display device, if a hardware system of the display device does not have a hardware interface, for receiving source codes, of a high-pixel camera, data from the camera cannot be displayed on a display screen of the display device.

In addition, due to the limitation of the hardware structure, a hardware system of a traditional display device only supports one hard decoding resource, and usually only supports 4K-resolution video decoding to the greatest extent. Therefore, when it is desired to make a video chat while watching Internet television, in order not to reduce the resolution of a network video screen, it is required to use hard decoding resources (usually a graphics processing unit (GPU) in the hardware system) to decode a network video. In this case, a video chat screen is processed only by soft decoding of the video via a general-purpose processor (e.g., a central processing unit (CPU)) in the hardware system.

Processing the video chat screen by using soft decoding will greatly increase a data processing load of the CPU. When the data processing load of the CPU is too heavy, the screen may freeze or become unsmooth. Further, due to data processing capability of the CPU, when the CPU soft decoding is used to process the video chat screen, usually, it is impossible to achieve multi-channel video calls. When the user wants to simultaneously make video chats with multiple other users in the same chat scenario, there will be access block.

Some embodiments of the present disclosure disclose a dual-hardware system architecture to implement multi-channels of video chat data (at least one local video).

The following first describes terms in the present disclosure with reference to the drawings. It is noted that the following description of each term only serves to make the contents of the present disclosure easier to understand, rather than to limit the protection scope of the present disclosure.

The term "module" used in various embodiments of the present disclosure may refer to any known or later developed hardware, software, firmware, artificial intelligence, fuzzy logic, or a combination of hardware or/and software codes and can execute functions related to the component.

The term "remote controller" used in various embodiments of the present disclosure refers to a component of an electronic device (e.g., the display device disclosed in the present disclosure), and the component can generally control the electronic device wirelessly within a short distance. The component can be generally connected to the electronic device via infrared and/or radio frequency (RF) signals and/or Bluetooth, and may also include at least one of functional modules such as a WiFi, a wireless USB (Universal Serial Bus), a Bluetooth and a motion sensor. For example, in a handheld touch remote controller, most of physical built-in hard keys, in a general remote control device, are replaced with a user interface in a touch screen.

The term "gesture" used in various embodiments of the present disclosure refers to a user's behavior for expressing expected ideas, actions, goals, and/or results through a change of a hand shape or hand movement.

The term "hardware system" used in various embodiments of the present disclosure may include at least one of physical components consisting of mechanical, optical, electrical, and magnetic devices such as an integrated circuit (IC) and a printed circuit board (PCB) and having calculating, controlling, storing, inputting and outputting functions.

FIG. 1 illustrates a schematic diagram of an operation scenario between a display device and a control device according to an embodiment. As shown in FIG. 1, a user may operate a display device 200 via a control device 100.

The control device 100 may be a remote controller 100A, and may communicate with the display device 200 through at least one of infrared protocol communication, Bluetooth protocol communication, ZigBee protocol communication, or other short-distance communication protocols to control the display device 200 in wireless or other wired manner. The user may control the display device 200 by inputting user instructions through keys on the remote controller, voice input, control panel input, etc. For example, the user may control the functions of the display device 200 by inputting corresponding control instructions through volume up and volume down keys, channel control keys, up/down/left/right directional keys, voice input keys, menu keys and power key on the remote controller.

The control device 100 may also be a smart device, such as a mobile terminal 100B, a tablet computer, a computer and a notebook computer, and may communicate with the display device 200 through at least one of a local area network (LAN), a wide area network (WAN), a wireless local area network (WLAN) or other networks, and controls the display device 200 through an application corresponding to the display device 200. For example, an application running on the smart device is used to control the display device 200. The application may provide the user with various controls through an intuitive user interface (UI) on a screen associated with the smart device.

Exemplarily, software applications may be installed on both the mobile terminal 100B and the display device 200, so that connection and communication therebetween may be realized through a network communication protocol, and furthermore, the purposes of one-to-one control operation and data communication are achieved. For example, a control instruction protocol may be established between the mobile terminal 100B and the display device 200, a remote control keyboard is synchronized to the mobile terminal 100B, and the function of controlling the display device 200 is achieved by controlling the user interface on the mobile terminal 100B; or audio and video contents displayed on the mobile terminal 100B are transmitted to the display device 200 to achieve a synchronous display function.

As shown in FIG. 1, the display device 200 may further performs data communication with a server 300 by multiple communication manners. In various embodiments of the present disclosure, the display device 200 may be allowed to communicate with the server 300 through at least one of the local area network, the wireless local area network, or other networks. The server 300 may provide various contents and interactions to the display device 200.

Exemplarily, the display device 200 receives software updates by transmitting and receiving information, and interacting with an electronic program guide (EPG), or accesses a remotely stored digital media library. The server 300 may be one group or multiple groups, and may be one or more types of servers. The server 300 provides other network service contents such as video on demand and advertising services.

The display device 200 may be a liquid crystal display, an organic light emitting diode (OLED) display, a projection display device, or a smart television. The specific type, size, resolution, etc. of the display device are not limited. Those skilled in the art should understand that some changes in performance and configuration may be made to the display device 200 if necessary.

In addition to providing a broadcast receiving television function, the display device 200 may further additionally provide a smart network television function that usually supports on a computer. Exemplarily, an Internet television, a smart television, an IPTV, etc. are included.

As shown in FIG. 1, the display device may be connected or provided with a camera, and is used to display images captured by the camera on a display interface of the display device or other display devices to realize interactive chats among users. In some embodiments, the images captured by the camera may be displayed on the display device in a full screen, a half screen, or any selectable region.

As an alternative connection, the camera is connected with a rear housing of the display through a connecting plate, and is fixedly installed on an upper-middle portion of the rear housing of the display. As a way for mounting, the camera may be fixedly installed on any position of the rear housing of the display as long as it is ensured that an image capture region is not blocked by the rear housing, e.g., the image capture region and the display device have the same display orientation.

As another alternative connection, the camera may be connected with the rear housing of the display through a connecting plate or other conceivable connectors which allows for lifting up and down, and a lifting motor is installed on the connector. From the user's perspective, when the user needs to use the camera or when an application needs to use the camera, the camera is lifted above the display; and when no camera is needed to be used, the camera may be embedded into the rear housing to protect the camera from being damaged.

As an embodiment, the camera used in the present disclosure may have 16 million pixels to achieve the purpose of ultra-high-definition display. In actual use, a camera with higher or lower than 16 million pixels may also be used.

When the camera is installed on the display device, contents displayed in the display device in different scenarios may be combined by many different ways, so as to achieve functions that cannot be achieved by the traditional display device.

Exemplarily, the user can make video chats with at least one other user while watching a video. The presentation of the video may be used as a background image, and a video chat window is displayed above the background image. Visually, this function can be called "chatting while watching".

Alternatively, in the "chatting while watching" scenario, the user can make at least one video chat across terminals while watching a live video or online video.

In another example, a user can make video chats with at least one other user while entering an education application for learning. For example, a student can realize a remote interaction with teachers while learning contents in the education application. Visually, this function may be called "chatting while learning".

In another example, when playing a card game, a user makes a video chat with players in the game. For example, when a player enters a game application and participates in a game, remote interaction with other players may be realized. Visually, this function can be called "playing while watching".

Alternatively, the game scenario is integrated with a video screen, and a portrait in the video screen is cut out and displayed on a game screen, so that user experience is improved.

Alternatively, in some sensing games (such as ball games, boxing games, running games and dancing games), by acquiring human body postures and movements through the camera, detecting and tracking body parts, detecting data of key points of human skeletons and then integrating with animations in the games, the games such as sports and dance scenarios are realized.

In another example, a user may interact with at least one other user in video and voice in a karaoke application. Visually, this function may be called "singing while watching". Preferably, when at least one user enters the application in a chat scenario, multiple users may join to complete recording of one song.

In another example, a user may turn on the camera locally to obtain images and videos. Visually, this function may be called "looking into the mirror".

In some other examples, more functions may be added or the above functions may be reduced. The functions of the display device are not limited specifically in the present disclosure.

Figure 2:
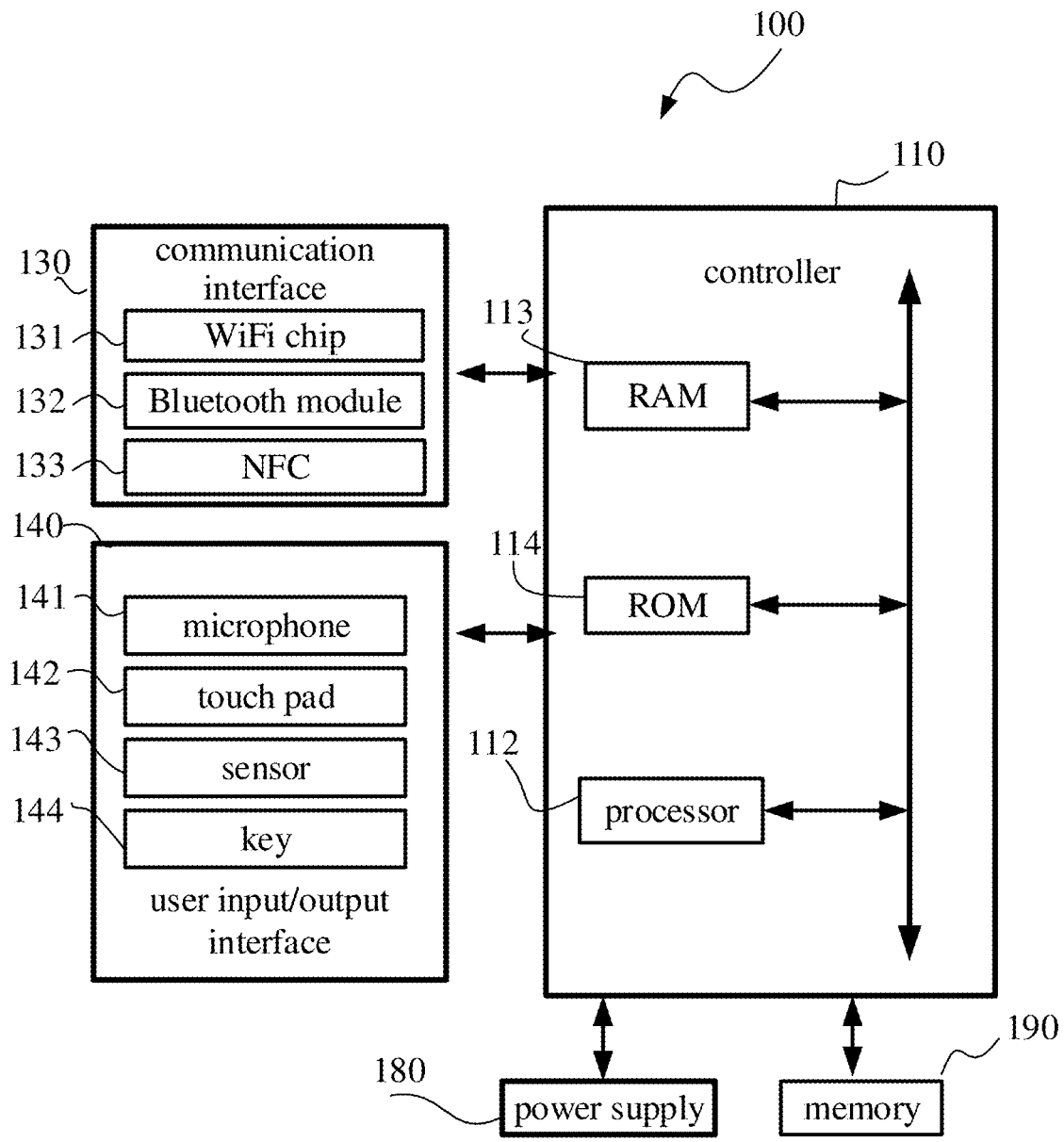
FIG. 2 illustrates a block diagram of hardware configuration of a control device 100 according to an embodiment.
Figure 3:
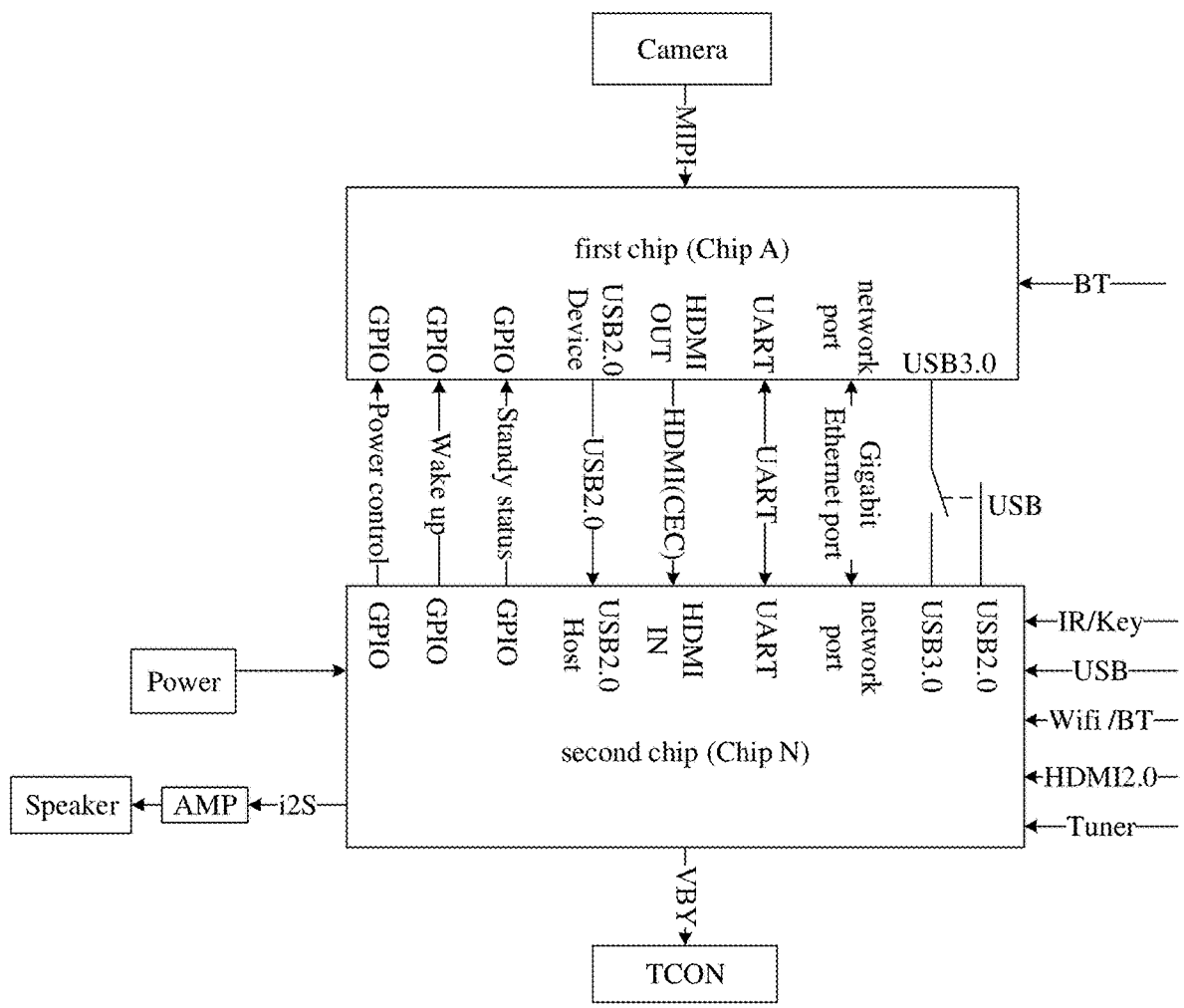
FIG. 3 illustrates a block diagram of hardware configuration of a display device 200 according to an embodiment.

FIG. 2 illustrates a block diagram of configuration of the control device 100 according to an embodiment. As shown in FIG. 3, the control device 100 includes a controller 110, a communicator 130, a user input/output interface 140, a memory 190 and a power supply 180.

The control device 100 is configured to control the display device 200, receive operations input from a user and convert the operations into instructions that can be recognized and responded by the display device 200, so as to function as an interaction medium between the user and the display device 200. For example, when the user operates the channel up and channel down keys on the control device 100, the display device 200 responds to the channel up and down operations.

In some embodiments, the control device 100 may be a smart device. For example, the control device 100 may be provided with various applications for controlling the display device 200 according to the user's needs.

In some embodiments, as shown in FIG. 1, the mobile terminal 100B or other smart electronic devices can achieve similar functions to the control device 100 after an application for operating the display device 200 is installed. For example, the user can install an application to provide various function keys or virtual keys of a graphical user interface on the mobile terminal 100B or other smart electronic devices to achieve the function of physical keys of the control device 100.

The controller 110 includes at least one of a processor 112, a read-only memory (RAM) 113 and a random access memory (ROM) 114, a communication interface and a communication bus. The controller 110 is used to control the running and operation of the control device 100, the communication and cooperation between internal components, and external and internal data processing functions.

The communicator 130 realizes communication with the display device 200 by control signals and data signals under the control of the controller 110. For example, the received user input signals are transmitted to the display device 200. The communicator 130 may include at least one of communication modules such as a WIFI module 131, a Bluetooth module 132 and a near field communication (NFC) module 133.

For the user input/output interface 140, the input interface includes at least one of input interfaces such as a microphone 141, a touch panel 142, a sensor 143 and keys 144. For example, the user may receive a user command input via voice, touch, gesture, pressing or other actions. The input interface converts a received analog signal into a digital signal and converts the digital signal into a corresponding instruction signal, and the corresponding instruction signal is sent to the display device 200.

The output interface includes an interface for transmitting the received user command to the display device 200. In some embodiments, the output interface may be an infrared interface or a radio frequency interface. For example, in the case of an infrared signal interface, the user input command needs to be converted into an infrared control signal according to an infrared control protocol and transmitted to the display device 200 through an infrared transmitting module. For another example, in the case of a radio frequency signal interface, the user input command needs to be converted into a digital signal, which is transmitted to the display device 200 by a radio frequency transmitting terminal after the digital signal is modulated according to a radio frequency control signal modulation protocol.

In some embodiments, the control device 100 includes at least one of the communicator 130 and the output interface. The control device 100 is configured with the communicator 130, such as a WIFI, a Bluetooth, a NFC and other modules, and the user input commands can be transmitted to the display device 200 after being encoded by a WIFI protocol, a Bluetooth protocol, or a NFC protocol.

The memory 190 is used to store various operating programs, data and applications for driving and controlling the control device 100 under the control of the controller 110. The memory 190 may store various control signal instructions input from a user.

The power supply 180 is used to provide power support for each component of the control device 100 under the control of the controller 110. The power supply 180 may be a battery and a related control circuit.

FIG. 3 illustrates a block diagram of hardware configuration of a hardware system in the display device 200 according to an exemplary embodiment.

When a dual-hardware system architecture is adopted, a mechanism relationship of the hardware system can be shown in FIG. 3. For facilitating description, one hardware system in the dual-hardware system architecture is referred to as a first hardware system or system A, or chip A, and the other hardware system is referred to as a second hardware system or system N, or chip N. The chip A includes a controller and various interfaces of the chip A, and the chip N includes a controller and various interfaces of the chip N. The chip A and the chip N may be respectively provided with an independent operating system, so that there are two independent but interrelated subsystems in the display device 200.

As shown in FIG. 3, connection, communication and power supply may be achieved between the chip A and the chip N through multiple different types of interfaces. Types of the interfaces between the chip A and the chip N may include at least one of a general-purpose input/output (GPIO) interface, a USB interface, a high definition multimedia interface (HDMI) interface, a universal asynchronous receiver/transmitter (UART) interface, etc. One or more of these interfaces may be used for communication or power transmission between the chip A and the chip N. For example, as shown in FIG. 3, in the dual-hardware system architecture, the chip N may be powered by an external power, while the chip A may be powered by the chip N instead of the external power.

In addition to the interface connected with the chip N, the chip A may include interfaces connected with other devices or components, such as a mobile industry processor interface (MIPI) and a Bluetooth interface connected with the camera, as shown in FIG. 3.

Similarly, in addition to the interface connected with the chip N, the chip N may include a V-by-One (VBY) interface connected with a timer control register (TCON) of a display screen, an i2S interface connected with a power amplifier (AMP) and a speaker, and at least one of an IR/Key interface, a USB interface, a Wifi interface, a Bluetooth interface, a HDMI interface, a Tuner interface, etc.

Figure 4:
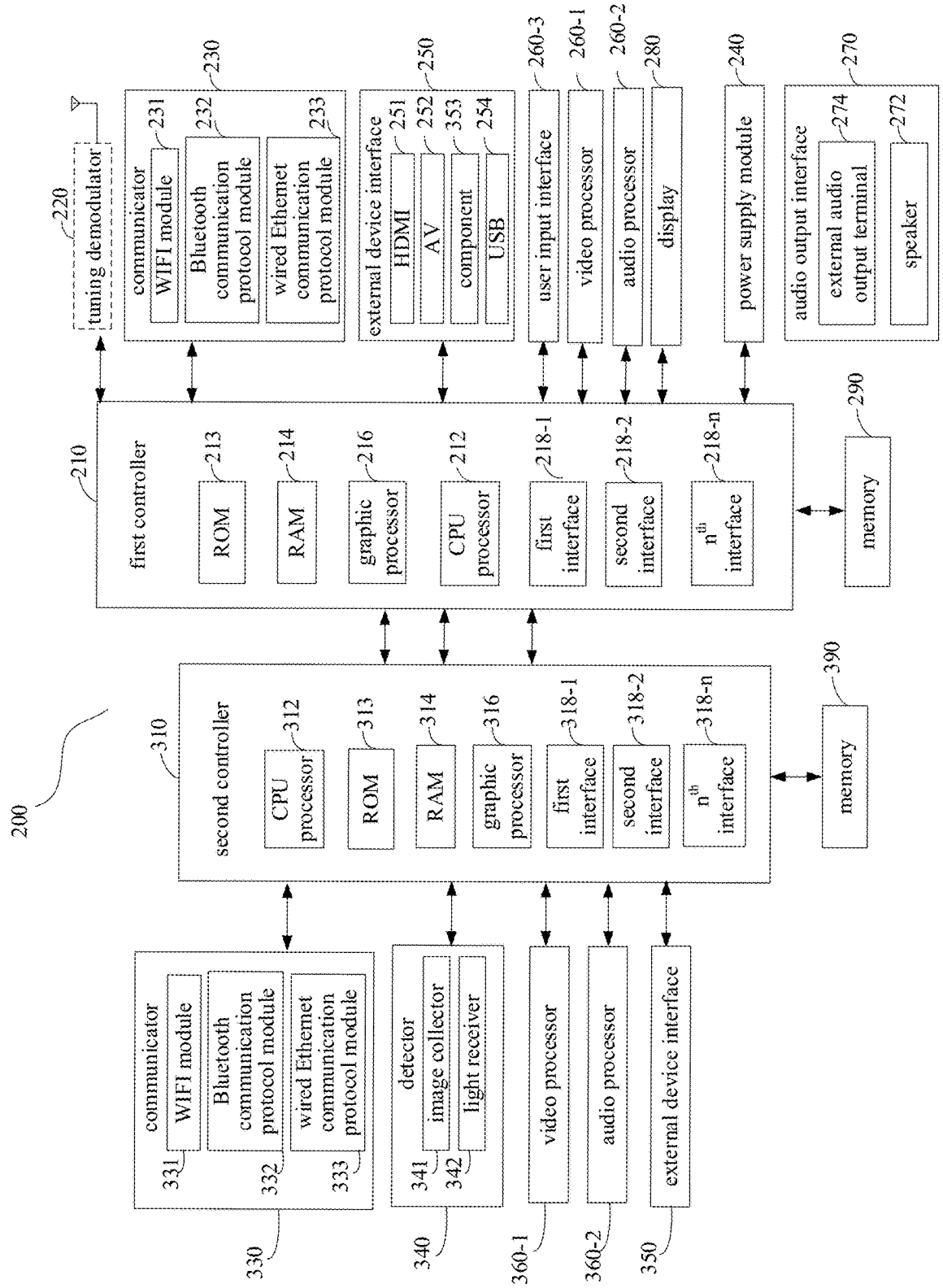
FIG. 4 illustrates a block diagram of a hardware architecture of the display device 200 according to FIG. 3.

The dual-hardware system architecture of the present disclosure will be further described below with reference to FIG. 4. It should be noted that FIG. 4 is only an exemplary description of the dual-hardware system architecture of the present disclosure, rather than a limitation on the present disclosure. In practical applications, the two hardware systems may include more or less hardware or interfaces as required.

FIG. 4 illustrates a block diagram of a hardware architecture of the display device 200 according to FIG. 3. As shown in FIG. 4, the hardware system of the display device 200 may include the chip A and the chip N, and modules connected with the chip A or the chip N through various interfaces.

The chip N may include at least one of a tuning demodulator 220, a communicator 230, an external device interface 250, a controller 210, a memory 290, a user input interface, a video processor 260-1, an audio processor 260-2, a display 280, an audio output interface 272 and a power supply. In other embodiments, the chip N may also include more or fewer modules.

The tuning demodulator 220 is used to perform tuning and demodulation processing such as amplification, frequency mixing and resonance on broadcast television signals received in a wired or wireless manner, thereby demodulating, from multiple wireless or wired broadcast television signals, audio and video signals carried in the frequency of a television channel selected by a user, and additional information (e.g., EPG data signals). According to different television signal broadcasting systems, signal paths of the tuning demodulator 220 may be various, e.g., terrestrial broadcasting, cable broadcasting, satellite broadcasting or Internet broadcasting. According to different modulation types, a signal modulation mode may be a digital modulation mode or analog modulation mode. According to different types of received television signals, the tuning demodulator 220 may demodulate analog signals and/or digital signals.

The tuning demodulator 220 is further controlled by the controller 210 to respond to the frequency of the television channel selected by the user and the television signals carried by the frequency according to the user's selection.

In some other exemplary embodiments, the tuning demodulator 220 may also be arranged in an external device, e.g., an external set-top box. In this way, the set-top box outputs television audio and video signals through modulation and demodulation, and inputs them to the display device 200 through the external device interface 250.

The communicator 230 is a component for communicating with external devices or external servers according to various communication protocol types. For example, the communicator 230 may include a WIFI module 231, a Bluetooth communication protocol module 232, a wired Ethernet communication protocol module 233, an infrared communication protocol module and other network communication protocol modules or near field communication protocol modules.

A connection between control signals and data signals may be established between the display device 200 and an external control device or a content providing device through the communicator 230. For example, the communicator may receive the control signals of the remote controller 100 according to control of the controller.

The external device interface 250 is a component that provides data transmission between a chip N and a chip A and among other external devices. The external device interface may be connected with external devices such as set-top boxes, game devices and notebook computers in a wired/wireless way, and may receive data, such as video signals (e.g., motion images), audio signals (e.g., music) and additional information (e.g., EPG), of the external devices.

The external device interface 250 may include any one or more of a HDMI interface 251, a composite video blanking and synchronization (CVBS) interface 252, an analog or digital component interface 253, a USB interface 254, a red, green and blue (RGB) interface (not shown in the drawings), etc. The number and types of the external device interfaces are not limited in the present disclosure.

The controller 210 controls the work of the display device 200 and responds to the user's operations by running various software control applications (such as an operating system and/or various applications) stored in the memory 290.

As shown in FIG. 4, the controller 210 includes at least one of a RAM 213, a ROM 214, a graphic processor 216, a CPU 212, a communication interface 218 and a communication bus. The RAM 213, the ROM 214, the graphic processor 216, the CPU processor 212 and the communication interface 218 are connected by a bus.

The ROM 213 is used to store various system startup instructions. For example, when a power-on signal is received, the display device 200 starts to power, and the CPU processor 212 runs the system start-up instructions in the ROM and copies temporary data of an operating system stored in the memory 290 to the RAM 214 to start the operating system. After the operating system has been initialized, the CPU processor 212 copies the temporary data of the various applications in the memory 290 to the RAM 214, and then starts to run and start the various applications.

The graphic processor 216 is used to generate various graphic objects, such as icons, operation menus and user input instruction display graphics. The graphic processor 216 includes an arithmetic unit which performs operations by receiving various interactive commands input from a user, and displays various objects according to display attributes. The graphic processor 216 further includes a renderer which generates various objects obtained based on the arithmetic unit, and displays rendering results on the display 280.

The CPU processor 212 is used to execute the operating system and applications stored in the memory 290 and execute various applications, data and contents based on receiving various interactive instructions input from the outside, so as to finally display and play various audio and video contents.

In some exemplary embodiments, the CPU processor 212 may include multiple processors. The multiple processors may include one main processor and one or more sub-processors. The main processor is used to perform some operations of the display device 200 in a pre-power-on mode, and/or to display images in a normal mode. The one or more sub-processors are used to perform an operation in a standby mode or other states.

The communication interface may include a first interface 218-1 to an $n^{th}$ interface 218-n. These interfaces may be network interfaces connected to external devices via network.

The controller 210 may control overall operations of the display device 200. For example, in response to receiving a user instruction for selecting a UI object displayed on the display 280, the controller 210 may perform an operation related to the object selected by the user instruction.

The object may be any one of selectable objects, such as a hyperlink or an icon. There are operations related to the selected object, e.g. displaying pages, documents, images associated with the hyperlink, or operations of launching an application corresponding to the icon. The user instruction for selecting a UI object may be an instruction input through various input devices (e.g., a mouse, a keyboard and a touch pad) connected to the display device 200 or a voice instruction corresponding to a voice spoken by the user.

The memory 290 includes various software modules stored for driving and controlling the display device 200. For example, the various software modules stored in the memory 290 include at least one of a base module, a detection module, a communication module, a display control module, a browser module and various service modules.

The base module is an underlying software module for signal communication among various hardware in the display device 200 and transmitting processing and control signals to an upper layer module. The detection module is a management module for collecting much information from various sensors or user input interfaces, and performing digital-to-analog conversion and analysis management.

For example, the voice recognition module includes a voice analysis module and a voice instruction database module. The display control module is a module for controlling the display 280 to display image contents, and can be used to play information such as multimedia image contents and UI interfaces. The communication module is a module for performing control and data communication with the external devices. The browser module is a module for performing data communication with browsing servers. The service module is a module for providing various services and various applications.

Meanwhile, the memory 290 is further used to store and receive external data and user data, images of various items in various user interfaces and visual effect diagrams of focus objects.

The user input interface is used to transmit the user's input signals to the controller 210, or to transmit signals output from the controller to the user. Exemplarily, the control device (e.g., a mobile terminal or a remote controller) may transmit input signals, such as power signals, channel selection signals and volume adjustment signals, input from the user to the user input interface, and then, the user input interface transfers the input signals to the controller. Or, the control device may receive output signals, such as audio, video, or data, which are output from the user input interface after being processed by the controller, and display the received output signals or output the received output signals in an audio or vibration manner.

In some embodiments, a user may input a user instruction through a graphical user interface (GUI) displayed on the display 280, and the user input interface receives the user input instruction through the GUI. Or, the user may input the user instruction by inputting a specific voice or gesture, and the user input interface recognizes the voice or gesture through a sensor to receive the user input instruction.

A video processor 260-1 is used to receive video signals, and perform video data processing such as decompression, decoding, scaling, noise reduction, frame rate conversion, resolution conversion and image synthesis according to a standard codec protocol of the input signals, so as to obtain the video signals displayed or played directly on the display 280.

Exemplarily, the video processor 260-1 includes a demultiplexing module, a video decoding module, an image synthesis module, a frame rate conversion module, a display formatting module, etc.

The demultiplexing module is used to demultiplex input audio and video data streams. For example, if MPEG-2 is input, the demultiplexing module demultiplexes it into a video signal, an audio signal, etc.

The video decoding module is used to perform processing, including decoding and scaling, on the demultiplexed video signals.

The image synthesis module, e.g., an image synthesizer, is used to superimpose and mix GUI signals input from a user or generated by the graphic generator with scaled video images to generate image signals for display.

The frame rate conversion module is used to convert frame rates of input videos, for example, frame rates of input videos of 24 Hz, 25 Hz, 30 Hz and 60 Hz are converted into frame rates of 60 Hz, 120 Hz or 240 Hz. The input frame rates may be associated with source video streams, and the output frame rates may be associated with refresh rates of the display. The input has a standard format, e.g., frame interpolation.

The display formatting module is used to change signals output by the frame rate conversion module into signals that conform to, e.g., a display format of the display. For example, a format conversion of the signals output by the frame rate conversion module is performed to output RGB data signals.

The display 280 is used to receive image signals input from the video processor 260-1, and display video contents and images and a menu operating interface. The display 280 includes a display component for displaying images and a driving component for driving image display. The displayed video contents may be from videos in broadcast signals received by the tuning demodulator 220, or from the video contents input from the communicator or the interface of the external device. The display 280 simultaneously displays a UI generated in the display device 200 and used to control the display device 200.

According to different types of the display 280, the display 280 further includes a driving component for driving the display. Or, if the display 280 is a projection display, the display 280 may further include a projection device and a projection screen.

The audio processor 260-2 is used to receive audio signals, and perform decompression and decoding according to the standard codec protocol of the input signals as well as audio data processing such as noise reduction, digital-to-analog conversion and amplification processing to obtain the audio signals that can be played in a speaker 272.

The audio output interface 270 is used to receive the audio signals output from the audio processor 260-2 under the control of the controller 210. The audio output interface may include the speaker 272 or an external audio output terminal 274 output to a generator of an external device, such as an external audio interface or a headphone output interface.

In some other exemplary embodiments, the video processor 260-1 may include one or more chips. The audio processor 260-2 may also include one or more chips.

And, in some other exemplary embodiments, the video processor 260-1 and the audio processor 260-2 may be separate chips, or may be integrated with the controller 210 in one or more chips.

The power supply is used to provide power supply support for the display device 200 with power input from an external power under the control of the controller 210. The power supply may include a built-in power supply circuit installed inside the display device 200, or may be a power supply installed outside the display device 200, e.g., a power interface that provides an external power in the display device 200.

Similar to the chip N, as shown in FIG. 4, the chip A may include a controller 310, a communicator 330, a detector 340 and a memory 390. In some embodiments, the chip A may further include a user input interface, a video processor, an audio processor, a display and an audio output interface. In some embodiments, there may also be a power supply that independently supplies power for the chip A.

The communicator 330 is a component for communicating with external devices or external servers according to various communication protocols. For example, the communicator 330 may include a WIFI module 331, a Bluetooth communication protocol module 332, a wired Ethernet communication protocol module 333, an infrared communication protocol module and other network communication protocol modules or near field communication protocol modules.

The communicator 330 of the chip A and the communicator 230 of the chip N also interact with each other. For example, the WiFi module 231 of the chip N is used to be connected to an external network and generate network communication with the external server, etc. The WiFi module 331 of the chip A is used to be connected to the WiFi module 231 of the chip N, and is not directly connected to the external network or the like. Therefore, for a user, one display device in the above embodiment only displays one WiFi account to the outside.

The detector 340 is a component of the chip A of the display device for collecting the external environment signals or signals interacting with the outside. The detector 340 may include a light receiver 342 and a sensor for collecting an ambient light intensity and can adaptively display parameter changes by collecting the ambient light. The detector 340 may further include an image collector 341, such as a camera and a webcam and may be used to collect ambient scenarios as well as the user's attributes or conduct an interaction of gestures with a user, can adaptively change display parameters, or can recognize the user's gestures to achieve a function of interaction with the user.

The external device interface 350 is a component for providing data transmission between the controller 310 and the chip N or among other external devices. The external device interface may be connected with external devices such as set-top boxes, game devices and notebook computers in a wired/wireless manner.

The controller 310 controls the display device 200 and responds to the user's operations by running various software applications (e.g., installed third-party applications) stored in the memory 390 and interacting with the chip N.

As shown in FIG. 4, the controller 310 includes at least one of a ROM 313, a RAM 314, a graphic processor 316, a CPU processor 312, a communication interface 318 and a communication bus. The ROM 313, the RAM 314, the graphic processor 316, the CPU processor 312 and the communication interface 318 are connected by a bus.

The ROM 313 is used to store various system startup instructions. The CPU processor 312 runs system startup instructions in the ROM, and copies temporary data of an operating system stored in the memory 390 to the RAM 314 to run the startup operating system. After the operating system has been started, the CPU processor 312 copies the temporary data of various applications in the memory 390 to the RAM 314, and then starts to run and start the various applications.

The CPU processor 312 is used to execute the operating system and application instructions stored in the memory 390, communicate and perform transmission and interaction of the signals, data, instructions, etc. with the chip N, and execute various applications, data and contents according to the received various interactive instructions input from the outside, so as to finally display and play various audio and video contents.

The communication interface may include a first interface 318-1 to an $n^{th}$ interface 318-n. These interfaces may be network interfaces connected to external devices via a network, or network interfaces connected to the chip N via a network.

The controller 310 may control overall operations of the display device 200. For example, in response to receiving the user's instruction for selecting a UI object displayed on the display 280, the controller 210 may perform an operation related to the object selected by the user instruction.

The graphic processor 316 is used to generate various graphic objects, such as icons, operation menus and user input instructions to display graphics. The graphic processor 316 includes an arithmetic unit which performs operations by receiving various interactive instructions input from a user, and displays various objects according to display attributes. The graphic processor 316 further includes a renderer which generates various objects obtained based on the arithmetic unit, and displays rendering results on the display 280.

Both the graphic processor 316 of the chip A and the graphic processor 216 of the chip N can generate various graphic objects. Distinctively, if an application 1 is installed on the chip A and an application 2 is installed on the chip N, when a user is on an interface of the application 1 and an instruction input from a user is executed in the application 1, the graphic processor 316 of the chip A generates a graphic object. When the user is on an interface of the application 2, and an instruction input from the user is executed in the application 2, the graphic processor 216 of the chip N generates a graphic object.

Figure 5:
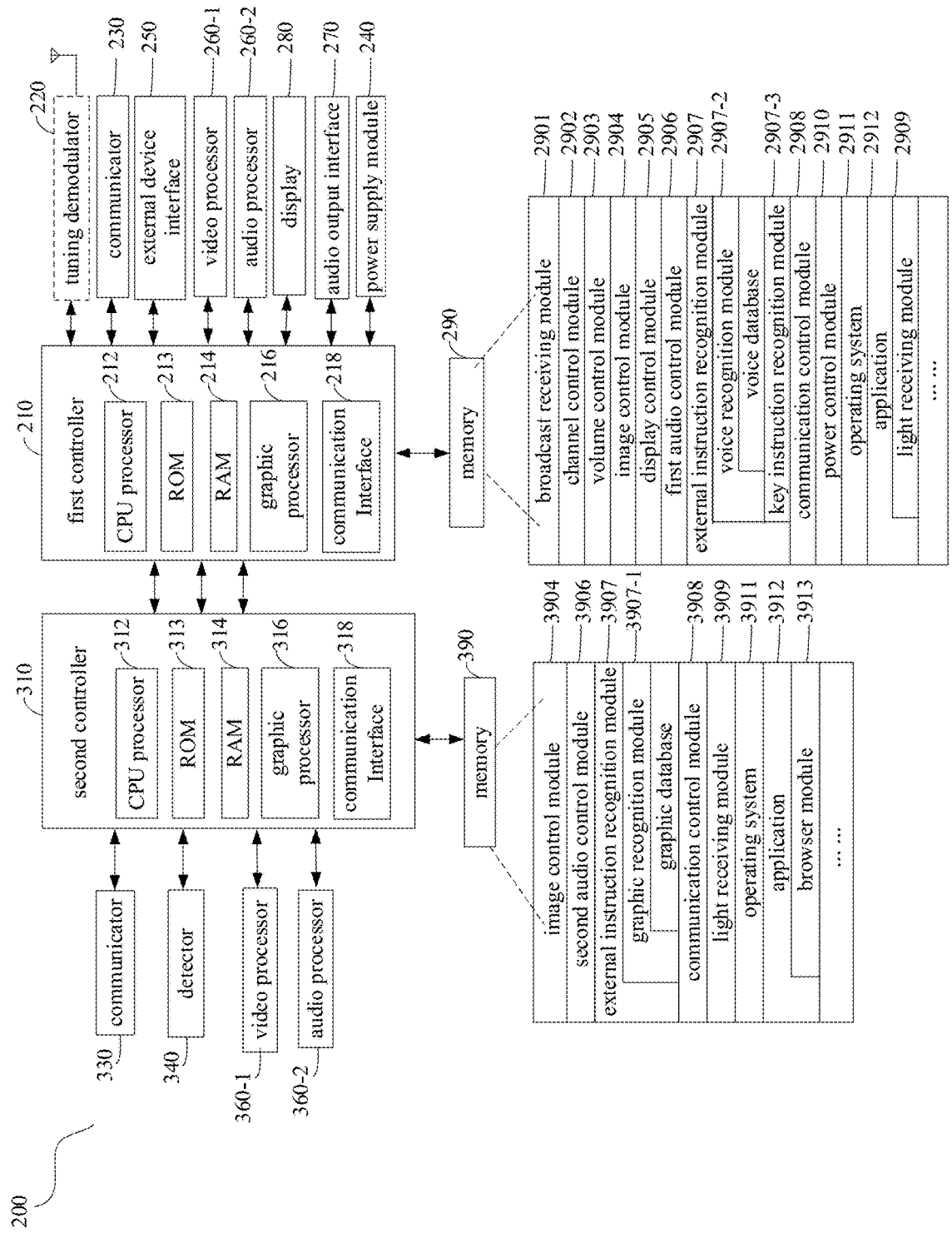
FIG. 5 illustrates a schematic diagram of functional configuration of the display device 200 according to an embodiment.

FIG. 5 illustrates a schematic diagram of functional configuration of a display device according to an exemplary embodiment.

In some embodiments, as shown in FIG. 5, the memory 390 of the chip A and the memory 290 of the chip N are respectively used to store operating systems, applications, contents, user data, etc. Under the control of the controller 310 of the chip A and the controller 210 of the chip N, a system for driving the display device 200 is running and a response is made to the user's operations. The memory 390 of the chip A and the memory 290 of the chip N may include volatile and/or nonvolatile memories.

For the chip N, the memory 290 is specifically used to store operating programs that drive the controller 210 in the display device 200, store various applications built in the display device 200, various applications downloaded by a user from the external device, various graphical user interfaces related to the applications, various objects related to graphical user interfaces, user data information and various internal data supporting the applications. The memory 290 is used to store system software such as a kernel of an operating system (OS), a middleware and applications, and store input video data and audio data as well as other user data.

The memory 290 is specifically used to store drive programs such as the video processor 260-1 and the audio processor 260-2, the display 280, the communication interface 230, the tuning demodulator 220 and the input/output interface and related data.

In some embodiments, the memory 290 may store software and/or programs. Software programs used to represent the OS include, e.g., a kernel, a middleware, application programming interfaces (APIs) and/or applications. Exemplarily, the kernel may control or manage system resources or functions implemented by other programs (such as the middleware, APIs, or applications), and may provide interfaces to allow the middleware and APIs, or the applications to access the controller so as to control or manage the system resources.

Exemplarily, the memory 290 includes at least one of a broadcast receiving module 2901, a channel control module 2902, a volume control module 2903, an image control module 2904, a display control module 2905, an audio control module 2906, an external instruction recognition module 2907, a communication control module 2908, a light receiving module 2909, a power control module 2910, an operating system 2911, other applications 2912, a browser module, etc. The controller 210, by running various software programs in the memory 290, executes functions such as a broadcast television signal reception demodulation function, a television channel selection control function, a volume selection control function, an image control function, a display control function, an audio control function, an external instruction recognition function, a communication control function, a light signal receiving function, a power control function, a software control platform supporting various functions, and a browser function.

The memory 390 stores various software modules for driving and controlling the display device 200. For example, the various software modules stored in the memory 390 include at least one of a base module, a detection module, a communication module, a display control module, a browser module and various service modules. Since the functions of the memory 390 and the memory 290 are relatively similar, please refer to the memory 290 for related details, which will not be repeated herein.

Exemplarily, the memory 390 includes an image control module 3904, an audio control module 2906, an external instruction recognition module 3907, a communication control module 3908, a light receiving module 3909, an operating system 3911, other applications 3912, a browser module, etc. The controller 210, by executing various software programs in the memory 290, executes various functions such as an image control function, a display control function, an audio control function, an external instruction recognition function, a communication control function, a light signal receiving function, a power control function, a software operating platform supporting various functions, and a browser function.

Distinctively, the external instruction recognition module 2907 of the chip N and the external instruction recognition module 3907 of the chip A can recognize different instructions.

Exemplarily, because an image receiving device, such as a camera, is connected with the chip A, the external instruction recognition module 3907 of the chip A may include a graphic recognition module 2907-1. The graphic recognition module 3907-1 stores a graphic database. When the camera receives an external graphic instruction, a correspondence of the received external graphic instruction to instructions in the graphic database is made to make instruction control over the display device. Since the voice receiving device and the remote controller are connected to the chip N, the external instruction recognition module 2907 of the chip N may include a voice recognition module 2907-2. The graphic recognition module 2907-2 stores a voice database. When the voice receiving device, etc. receives an external voice instruction, a correspondence of the received external voice instruction to instructions in the voice database is made to make an instruction control over the display device. Similarly, the control device 100 such as a remote controller is connected with the chip N, and a key instruction recognition module makes an instruction interaction with the control device 100.

Figure 6A:
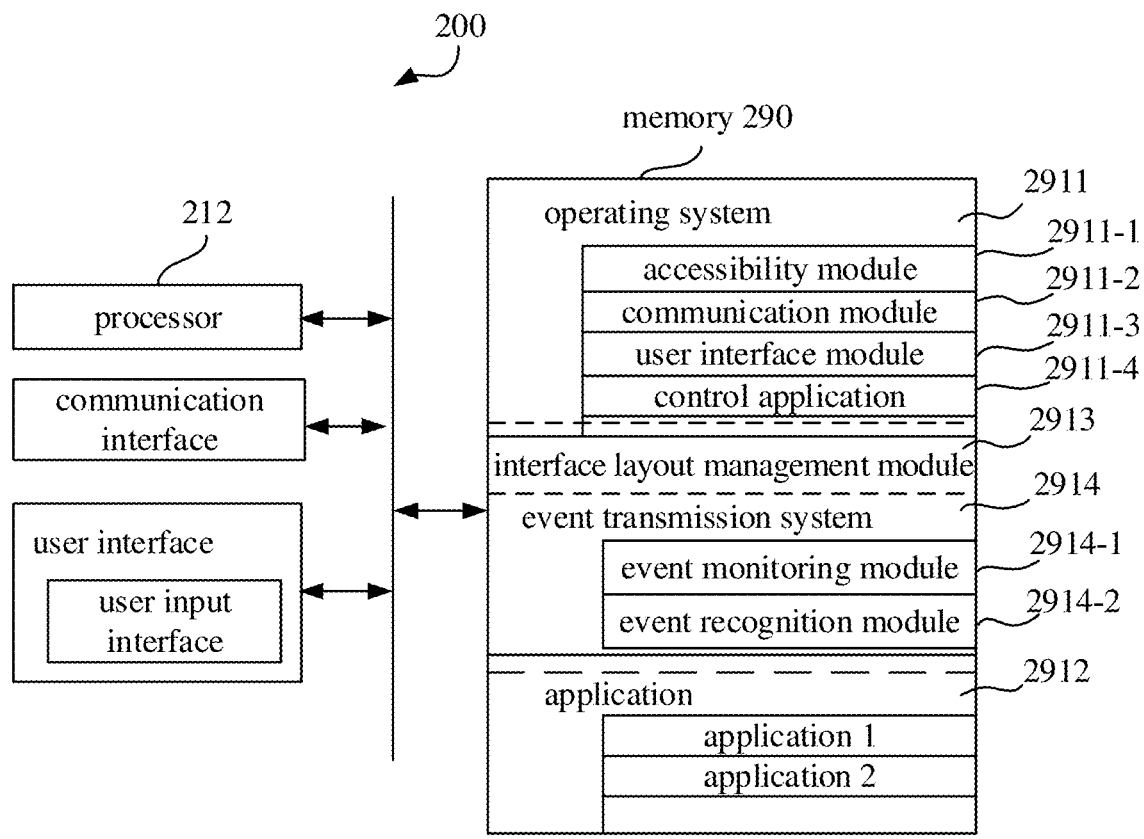
FIG. 6A illustrates a schematic diagram of software configuration in the display device 200 according to an embodiment.

FIG. 6A illustrates a block diagram of configuration of the software system in the display device 200 according to an exemplary embodiment.

For the chip N, as shown in FIG. 6A, the operating system 2911 includes an operation executing software which is used for processing various basic system services and executing hardware-related tasks and acts as a medium for data processing between applications and hardware components.

In some embodiments, the kernel of the operating system may include a series of software for managing the hardware resources of the display device and providing services for other programs or softwares.

In some other embodiments, the kernel of the operating system may include one or more device drivers, and the device drivers may be one set of software codes in the operating system and are used for helping operating or controlling on devices or hardware associated with the display device. The drivers may include codes for operating a video, an audio, and/or other multimedia components. Exemplarily, displays, cameras, Flash, WiFi and audio drivers are included.

An accessibility module 2911-1 is used to modify or access the applications, so as to realize accessibility to the applications and operability of display contents thereby.

A communication module 2911-2 is used to be connected to other external devices via related communication interfaces and communication networks.

A user interface module 2911-3 is used to provide objects for displaying the user interface, for being accessed by various applications, and can achieve operability for a user.

A control application 2911-4 is used to control process management and includes running a time application, etc.

An event dispatch system 2914 may be implemented in the operating system 2911 or in the application 2912. In some embodiments, the event dispatch system 2914 is implemented in the operating system 2911 on the one hand, and meanwhile, the event dispatch system 2914 is implemented in the application 2912 and is used for monitoring various user input events, so as to execute a processing program for one or more sets of predefined operations according to recognition results of various events or sub-events denoted and responded by various events.

An event listening module 2914-1 is used to listen events or sub-events input via the user input interface.

An event recognition module 2914-2 is used to recognize various events or sub-events, and transmit them to processing programs for processing by executing the corresponding one or more sets from definitions of various events input via various user input interfaces.

The events or sub-events refer to input detected by one or more sensors in the display device 200 and input from the external control device (e.g., the control device 100), e.g., various sub-events of voice input, sub-events of gesture input of gesture recognition and sub-events of instruction input via keys of the control device. Exemplarily, one or more sub-events in the remote controller include multiple forms including, but not limited to one or a combination of pressing up/down/left/right/keys, pressing an "OK" key, and pressing keys as well as the operations, such as moving, pressing and releasing, of non-physical keys.

An interface layout management module 2913 directly or indirectly receives various events or sub-events input from various users and monitored by the event dispatch system 2914, and is used for updating layout of the user interface, including, but not limited to various operations related to the interface layout, such as the position of each control or sub-control in the interface, and the size, position, or hierarchy of a container.

Since the functions of the operating system 3911 of the chip A and the operating system 2911 of the chip N are relatively similar, please refer to the operating system 2911 for related details, which will not be repeated herein.

Figure 6B:
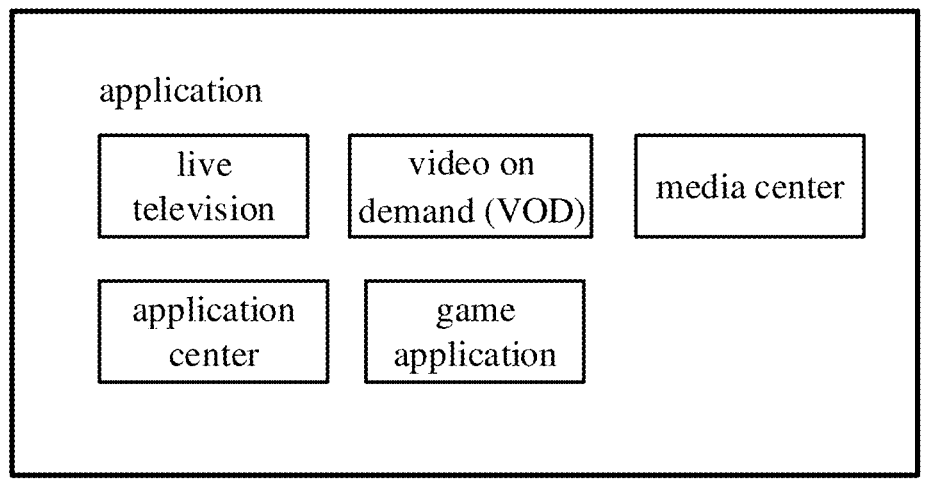
FIG. 6B illustrates a schematic diagram of an application configuration in the display device 200 according to an embodiment.

For the application control in the interactive interface as shown in FIG. 6B, an application layer of the display device includes various applications that can be executed on the display device 200.

The application layer 2912 of the chip N may include, but is not limited to, one or more applications, such as video-on-demand applications, application centers and game applications. The application layers 3912 of the chip A may include, but are not limited to, one or more applications, such as a live television application, a media center application, etc. It should be noted that the applications included in the chip A and the chip N respectively are determined according to the operating system and other designs, and the applications included in the chip A and the chip N are not needed to be specifically limited and divided in the present application.

The live television application may provide a live television through different signal sources. For example, the live television application may use the television signals input from a cable television, wireless broadcasting, satellite services, or other types of live television services; and the live television application can display a video of the live television signals on the display device 200.

The video-on-demand application can provide videos from different storage sources. Unlike the live television application, the video-on-demand provides video display from certain storage sources. For example, the video-on-demand may come from a server side of cloud storage or a local hard disk memory that contains the stored video programs.

The media center application can provide applications played by various multimedia contents. For example, the media center may be different from a live television or video on demand, and a user can access services provided by various images or audios via the media center application.

The application center can provide various stored applications. The application may be a game, an application, or some other applications that are related to a computer system or other devices, but can be run on the display device. The application center can obtain these applications from different sources, store them in a local memory, and then run the applications on the display device 200.

Figure 7:
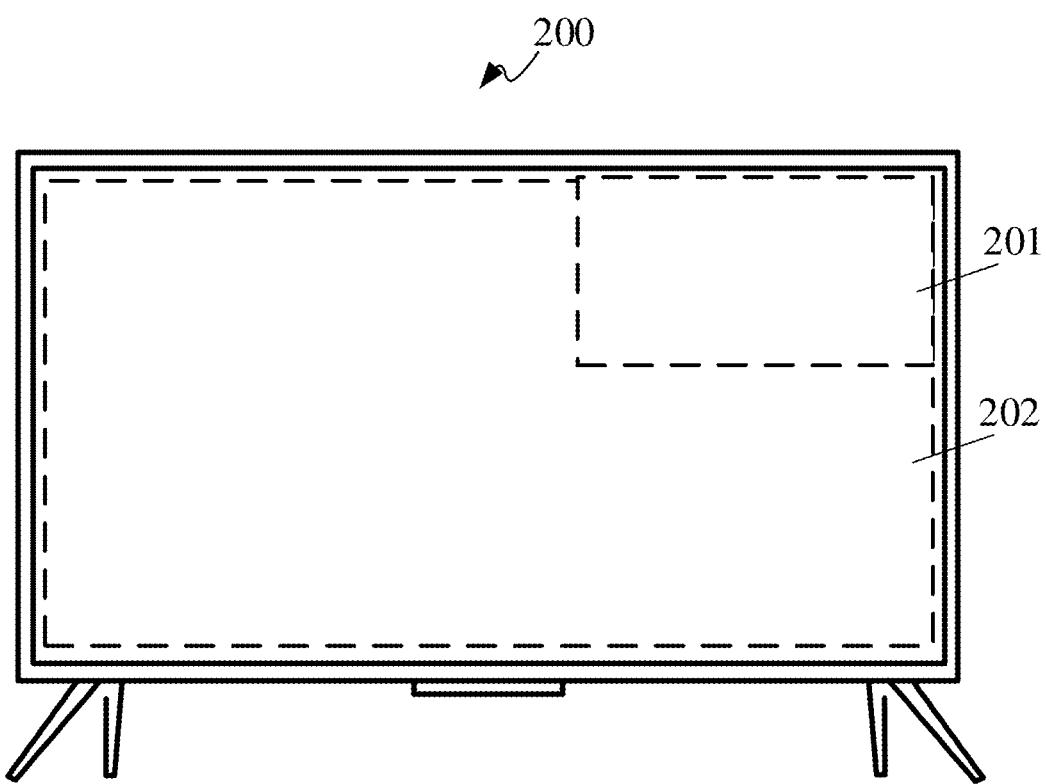
FIG. 7 illustrates a schematic diagram of a user interface in the display device 200 according to an embodiment.

FIG. 7 illustrates a schematic diagram of the user interface in the display device 200 according to an exemplary embodiment. As shown in FIG. 7, the user interface includes multiple display view regions, such as a first display view region 201 and a play region 202, where the play region includes one or more different items. The user interface further includes a selector for indicating that an item is selected, and the position of the selector may be moved through user input, so as to change a selection of different items.

It should be noted that the multiple display view regions may present with different priorities. For example, the first display view region may display a content of a video chat item, and a second display view region may display a content of an application layer item (e.g., a webpage video, a VOD (Video on Demand) display and an application).

In some embodiments, the content of the second display view region includes a content displayed on the video layer and a part of the content displayed on the floating layer, and the content of the first display view region includes a content displayed on the floating layer. The floating layers in the first display view region and the second display view region are different floating layers.

In some embodiments, there are different priorities for the presentation of different display view regions, and the display view regions with different priorities have different display priorities. For example, the priority of a system layer (e.g., a video layer) is higher than the priority of the application layer. When a user uses and obtains the selector and switches the window in the application layer, the window of the display view region of the application layer does not block the window of the system layer. When the size and position of the display view region of the application layer are changed according to the choice of the user, the size and position of the display view region of the system layer are not influenced.

In some embodiments, e.g., for a mode of picture-in-picture, two different display windows may be drawn in the same layer to achieve display screens with the same level. At the moment, the selector may be switched between the first display view region and the second display view region (i.e., switch between two display windows). At this time, in some embodiments, when the size and position of the first display view region are changed, the size and position of the second display view region may be changed accordingly.

In some embodiments, for a dual-chip smart television 200, independent operating systems may be installed in the chip A and the chip N, so that there are two independent but related sub-systems in the display device 200. For example, both the chip A and the chip N may be independently installed with Android and various APPs, so that each chip can achieve a certain function, and the chip A and the chip N can cooperate to achieve certain functions.

In some embodiments, for a smart television 200 that is not dual-chip (for example, a single-chip smart television), there is one system chip, and the operating system controls realization of all the functions of the smart television.

In some embodiments, video calling on the smart television includes making a call or answering a call. In order to describe the entire process of the video call, taking a scenario where a frontend page of the smart television is playing a video before video call as an example the specific process of making a call and answering a call will be described. Making a call refers to a scenario where the smart television acts as a calling party, and answering a call refers to a scenario where the smart television acts as a called party.

In some embodiments, the frontend page is an interface that can obtain a focus in the operating system. In an Android system, the frontend page refers to a page, provided by an Android foreground service that can acquire a focus.

In some embodiments, the frontend page is a page that is active in the operating system.

In some embodiments, the process of making a call is as follows: starting a preset application interface, and selecting a predefined control in the preset application interface and initiating a calling process and present a calling interface on the display.

In some embodiments, the process of making a call is as follows: while a video is being played, an instruction for establishing a video call from a user is received, and a call interface is started in a frontend.

Figure 8:
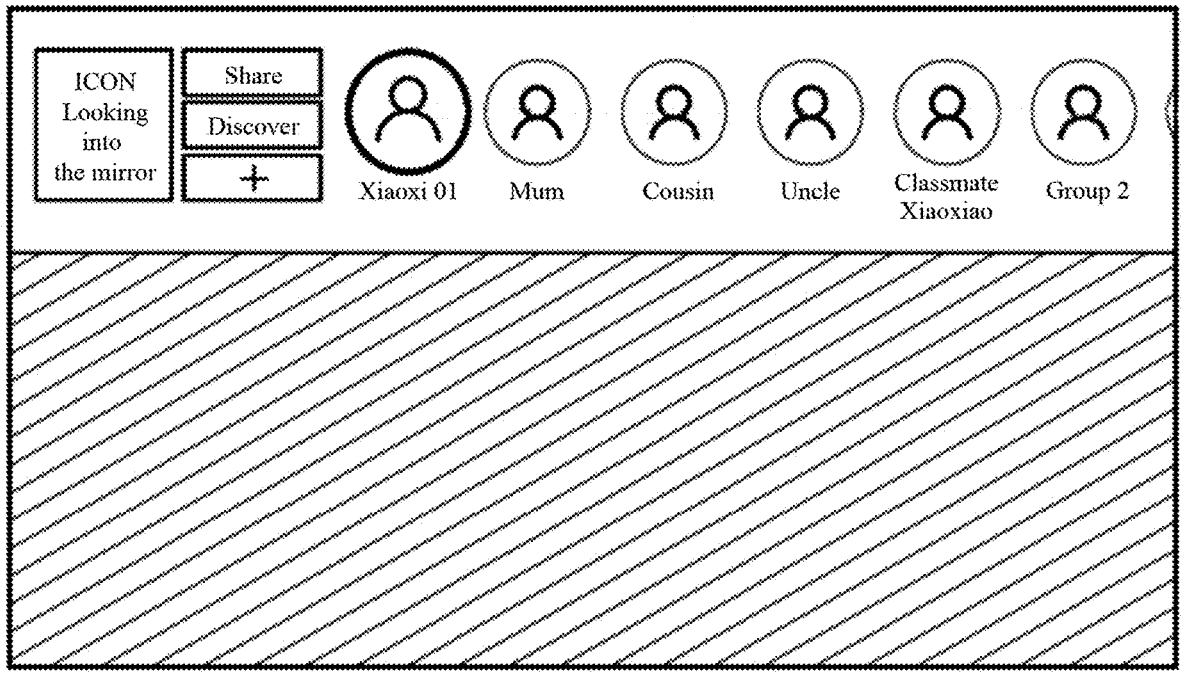
FIG. 8 illustrates a schematic diagram of a contact floating layer according to an embodiment.

In some embodiments, when watching a video or using other applications, a user triggers a key on the remote controller to invoke a control for displaying contact information in the form of floating layer. The contact information control is shown in FIG. 8, and the contact information control may adopt an ODS (Operational Data Store) floating layer form or other forms, and can float above a page where the video is played.

In some embodiments, the contact information control includes multiple sub-controls. Exemplarily, a "looking into the mirror" control from "looking into the mirror" application, is used to start a smart camera to take photos, record a video and perform other activities. A "share" control is used for, after being selected by the user, sharing a video that is currently displayed or a currently used application in a "Family" interface of the smart television according to the video that is currently played or used application and an account of the smart television. A "discover" control may enter a "Family" interface of a contact after being selected by a user to view contents shared by different contacts. A contact control at least includes a control of themselves and controls of other contacts. Upon one of the controls of other contacts is selected, an interface shown in FIG. 9 is displayed and upon the control of themselves is selected, a personal information editing page is presented.

Figure 9:
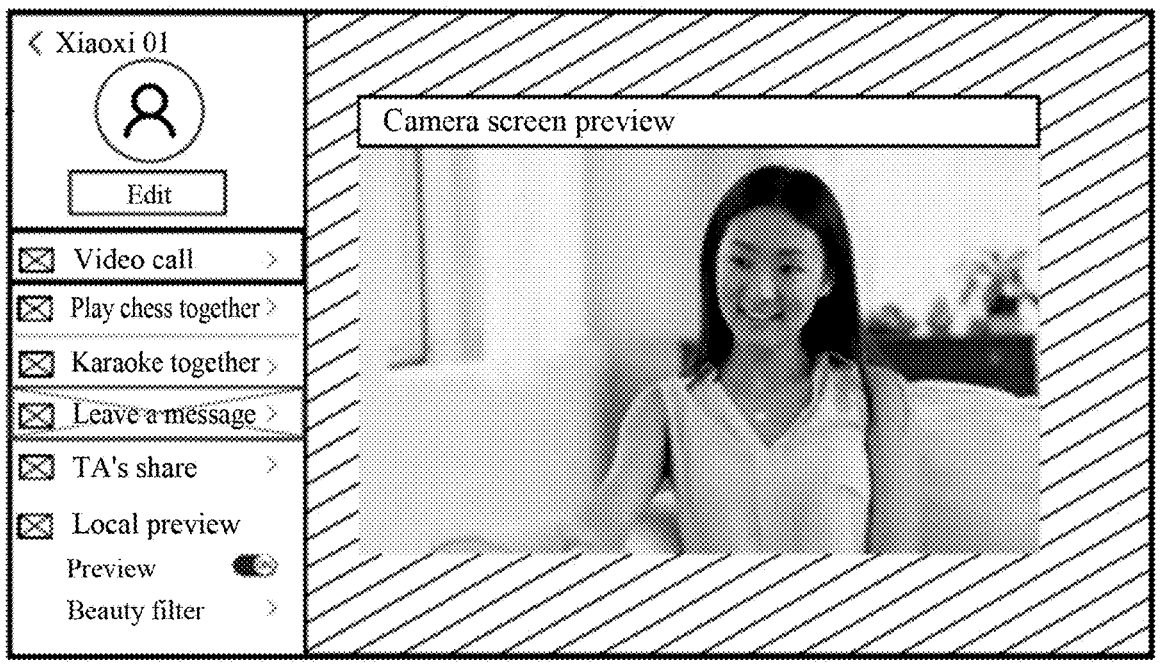
FIG. 9 illustrates a schematic diagram of a contact function list according to an embodiment.

In some embodiments, by controlling directional keys on the remote controller, a target contact control can be selected, and then, when clicking the "OK" key, a contact function list interface will be opened, and the interface of the contact function list is shown in FIG. 9 and includes a function region and a local video preview region. The function region includes: an editing control for editing contact information; a video call control for establishing a video call; a control for playing chess together and a control for karaoke together, which are used for starting applications and initiating a small window video call, where the application started by the control for playing chess together and the application started by the control for karaoke together are different; a TA's "share" control for viewing the "Family" of the contact; and a local preview control for controlling the local video preview region.

Figure 10:
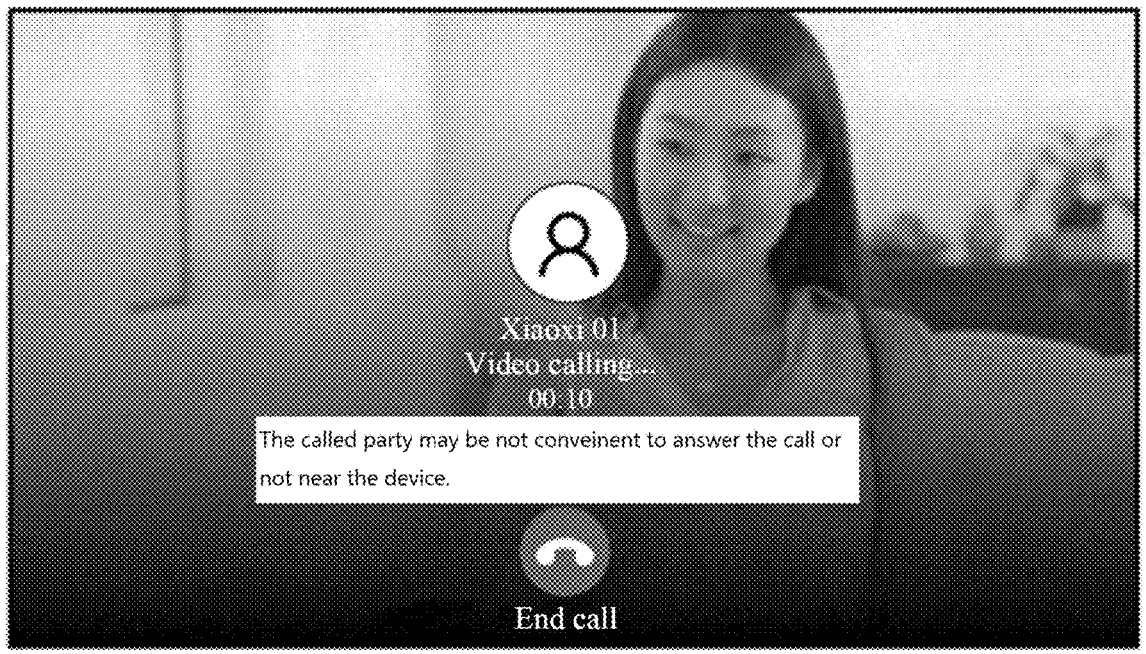
FIG. 10 illustrates a schematic diagram of a calling call interface according to an embodiment.

In some embodiments, the video call control is selected in the contact function list to complete a process of inputting the instruction for initiating a video call. For example, the directional keys on the remote controller are used to select a contact control of Xiaoxi 01 as a target contact control in the contact floating layer control. When clicking the "OK" key, the contact function list interface corresponding to the contact control of Xiaoxi 01 is opened, and clicking a video call option to select to call the contact, and then, the smart television can transmit an instruction for initiating the video call with Xiaoxi 01 to a "hi" application. After the "hi" application receives the instruction for initiating the video call, the frontend starts a calling interface, the calling interface is displayed on the frontend page, and the calling interface is as shown in FIG. 10.

In some embodiments, the calling interface includes a target contact information display control, a timing control and a controlling control (exemplarily, an end call control, an answer control and a hold control). In some embodiments, the controlling control can be displayed on the call interface in response to the user's command, and can be hidden when the command has not been received or the display exceeds a preset duration. In some embodiments, a reminder control may be further included, and the reminder control is not displayed when the duration obtained by timing control is within the preset duration, and is displayed to a user after the timing duration reaches the preset duration.

Figure 11:
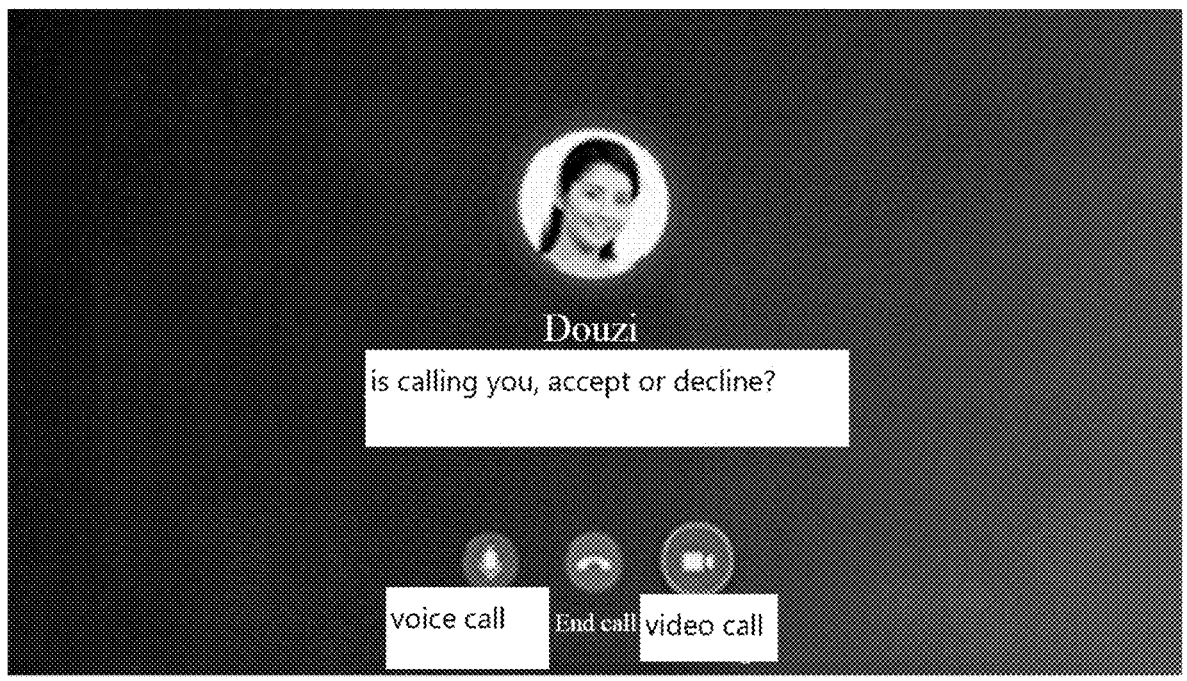
FIG. 11 illustrates a schematic diagram of a called call interface according to an embodiment.

In some embodiments, the process of a called call is as follows: while a video is being played, the smart television receives a message for indicating an incoming call and parses the message. If the smart television is not in a call state and the camera is not occupied, a called call interface is presented at the frontend. If the smart television is in a call state and/or the camera is occupied, the called call interface cannot be presented at the frontend, instead a reminder message will be popped up. The called interface is as shown in FIG. 11.

In some embodiments, the called interface includes a calling party information display control and other controlling controls (for example, a decline control, an accept control, a hold control, a voice accept control, a video call control and etc.). In some embodiments, the controlling controls can be displayed on the call interface in response to the user's command, and can be hidden when the command is not received or the display exceeds a preset duration. In some embodiments, after a user selects the voice accept control, a microphone and a speaker of the smart television are started to make a voice call without starting the camera. In some embodiments, after the user selects the video call control, the microphone, the camera and the speaker of the smart television are started to make the video call.

In some embodiments, the smart television includes the chip A and the chip N, and the video call is achieved on the chip N. In some other embodiments, the method for making a video call in the present disclosure, can also be used on a smart television that is not dual-chip as long as the hardware of the smart television can support a video function.

In some embodiments, the calling interface and the called 1 interface may be semi-transparent interface, and the calling interface and the called interface are started at the frontend. The original video-playing page displayed at the frontend is processed according to different situations.

In some embodiments, the calling interface and the called interface are displayed in the floating layer. Since the chip A and the chip N have their own operating systems, the systems determine positions of a video playing application. If the application is in the chip A and the video playing application and the video call application are in different chips, the frontend page for playing the video will still be displayed in the video layer and will not be influenced, and the video will not be paused. If the application is in the chip N and the video playing application and the video call are both in chip N, the video call is at the frontend, and the video playing application exits to the backend and enters a pause or suspend state. In some embodiments, video output can still be performed in the suspend state, so that a video playing interface is not influenced and is still displayed on the video layer, and the audio is muted.

In some embodiments, on the called interface, if a click on an end call control is received, the called interface directly exits, and the frontend page is restored to a screen which displays video, which means to cause the video layer, the video playing application interface, back to active state. Meanwhile, an instruction for ending the call is transmitted to the calling party via the server, and then, at the calling party side, the calling interface pops up a prompt that says the called party is busy and the calling interface exits.

Figure 12:
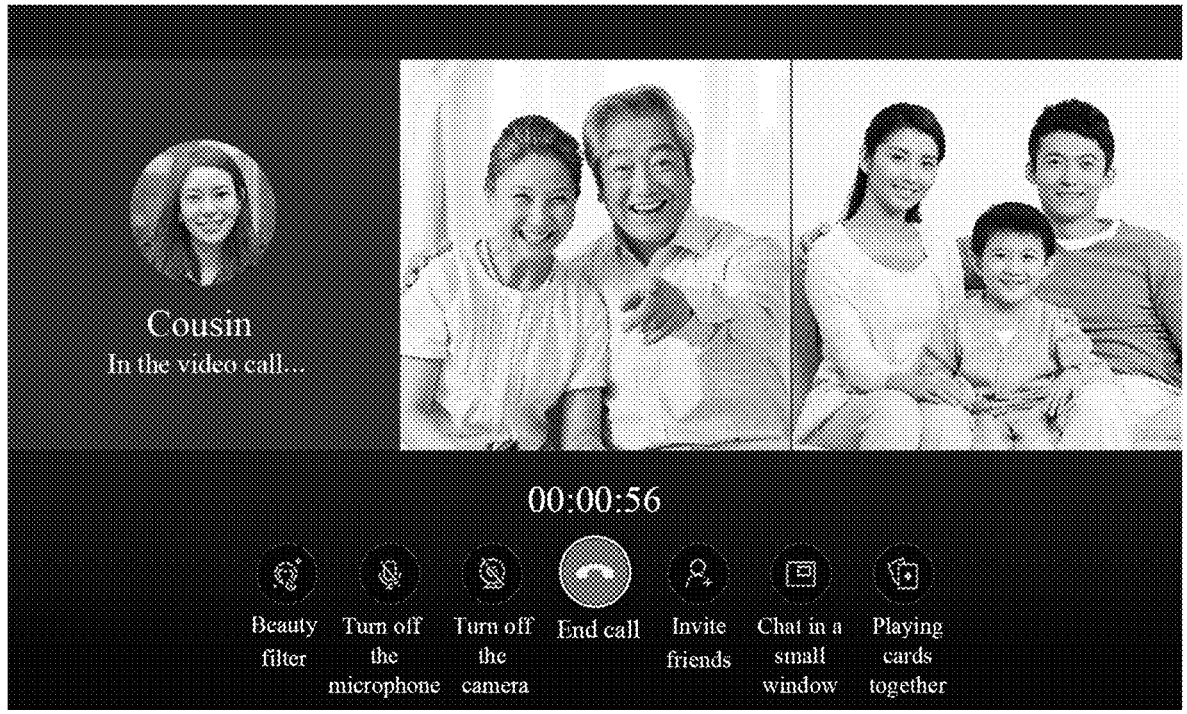
FIG. 12 illustrates a schematic diagram of a first call interface according to an embodiment.

In some embodiments, if clicking the "accept" icon, two parties establish a call, and the called interface is switched to the first call interface displayed in a full screen, and the first call interface is as shown in FIG. 12.

In some embodiments, after the video call is established, the first call interface displayed on a smart television of calling party is similar to the first call interface displayed on the called party. The first call interface is in a full screen, and the full screen means the first call interface substantially covers the display screen of the display. In some embodiments, part of an edge area may be reserved to display status information such as time and a network state.

In some embodiments, the first call interface includes a call window associated with the caller, a timing control and operation controls (for example, an end call control, a window switch control, a control for turning off a camera, a control for turning off a microphone, a control for inviting contacts and a control for playing games together). The controls can be displayed on the call interface in response to the user's command, and can be hidden when the command is not received or the display exceeds the preset duration. In some embodiments, the operation controls are displayed within a preset time after a calling service is established, and is automatically hidden after the preset time. Hiding the operation controls may be achieved by canceling the floating layer where the operation controls are located, or by setting the floating layer, where the operation controls are located, to be invisible to a user.

In some embodiments, after a user selects the control for turning off a camera, the position of the control for turning off a camera is switched to a control for turning on a camera, and meanwhile, a local camera is turned off and/or the camera is controlled to descend, so that the smart television does not collect local images or transmit video data to the other party. After the user selects the control for turning on a camera, the position of the control for turning on a camera is switched to the control for turning off a camera, and meanwhile, the local camera is turned on and/or the camera is controlled to rise to collect local images at the smart television side, and video data collected by the camera will be sent to the other party or parties. In some embodiments, after the camera is turned off, shielding floating layers are covered in the display window of the smart television whose camera has been turned off at the calling party side and the called party side. In some embodiments, contact information of local contacts corresponding to the smart television whose camera is turned off can be loaded on the shielding floating layers and displayed on the non-transparent floating layer visually.

In some embodiments, after a user selects the control for turning off a microphone, the position of the control for turning off a microphone is switched to a control for turning on a microphone, and meanwhile, a local microphone is turned off, so that the smart television does not collect local voice or does not transmit audio data to the other party or parties. After the user selects the control for turning on a microphone, the position of the control for turning on a microphone is switched to the control for turning off a microphone, and meanwhile, the local microphone is turned on, so that the smart television can collect local voice and transmit audio data to the other party or parties. In some embodiments, after the microphone is turned off, transparent shielding floating layers are loaded in the display window of the smart television whose microphone is turned off, and a prompt message for indicating that the microphone is turned off is displayed at a corner of the display window.

Figure 15:
FIG. 15 illustrates a layout diagram of a call window of a first call interface according to an embodiment.
Figure 16:
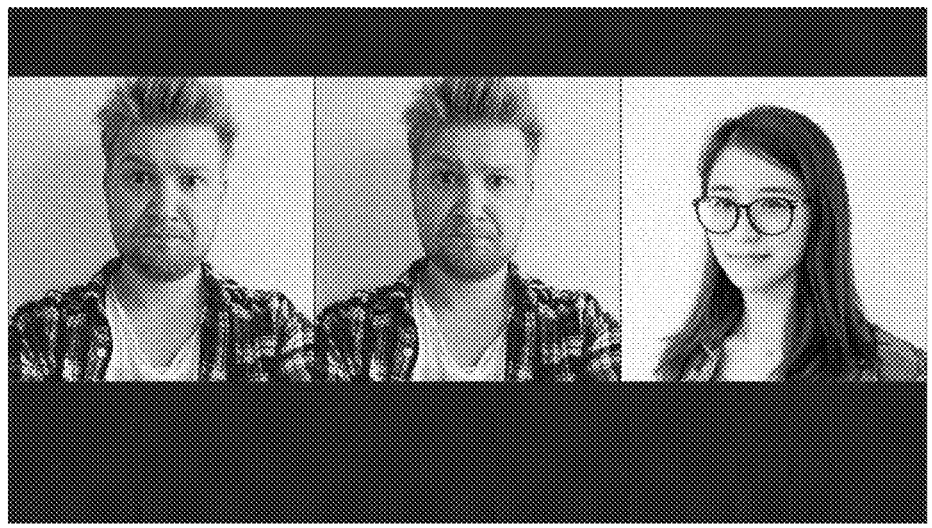
FIG. 16 illustrates a layout diagram of a call window of a first call interface according to another embodiment.

In some embodiments, exemplarily, in the calling process as shown in FIG. 15, the smart televisions of both parties involving in the call want to invite a third party. When a smart television of the third party does not respond, the smart televisions of both involved parties load new windows layout on the first display interface to increase video windows to adapt to more call participants, and videos of both involved parties are loaded to corresponding video windows in the new windows layout. The smart televisions of both involved parties use shielding floating layers to display status of the smart television at the third party via the video window of the third party on the first display interface as shown in FIG. 12, e.g., holding, declined and calling. After the smart television corresponding to the third party receives the call invitation, the first call interface displayed at the smart television of the third party is as shown in FIG. 16. It should be noted that different windows display video images collected by different smart televisions.

In some embodiments, if a user selects the control for playing games together, a prompt for inviting playing games together is displayed on the smart television of the invitee; and in response to all parties accepting the invitation to play games together, the call interface is switched to a second call interface, and a predefined application corresponding to the control for playing games together is started in the video layer.

Figure 13:
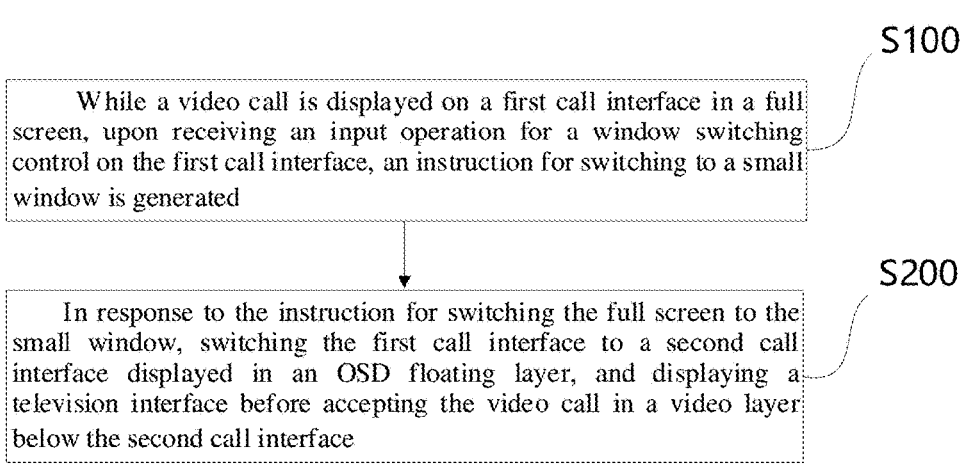
FIG. 13 illustrates a process diagram of a method for switching a video call interface on a smart television according to an embodiment.

In some embodiments, the contact control further includes a group contact control, and the group contact control corresponds to at least two other contacts. In some embodiments, upon the group contact control is selected, the displayed group contact control interface includes a video call control, and in response to the user selecting the video call control, a call invitation is transmitted to multiple contacts corresponding to the group contact control. After one of the other contacts accepts the invitation, the smart television of the inviter and the smart television that accepts the video invitation can enter the first call interface as shown in FIG. 13, and video information collected by the smart television of the inviter and video information collected by the smart television of the invitee are displayed in two different video windows, and the response states of other contacts are displayed on the shielding floating layers of the other video windows. In this way, a multi-person call can be made conveniently, and as long as someone accesses the call, the inviter can be in a call state, thereby reducing waiting time at the inviter side.

In some embodiments, after a video call service is established, if the video playing application is in the chip A, an event is transmitted to the video playing application to stop playing the video, the television will enter a suspend logic; if the video playing application is in the chip N, the video playing application is kept at the background, and the video playing page stops. It should be noted that if the video playing application is in the chip A, the video playing application and the video call are in different chips at this time, and thus, an event needs to be transmitted between different chips to stop the video being played.

In some embodiments, information transmission between the chips is realized through communication between framework layers of different chips, and the framework layers that receive the information transfer the information to corresponding applications.

Displaying a call in a full screen is designed considering that the main purpose of the user is to make a video call, and displaying the call in a full screen allows the user to obtain a better display effect.

After the video call is established, the call interface will be displayed in a full screen, which will block the full screen of the smart television. If the user has other operation requirements, the call interface displayed in a full screen will influence the user's other operations on the smart television, resulting in a waste of resources of the smart television. In order to solve the above technical problem, some embodiments of the present disclosure provide a method for switching a video call interface on a smart television. Please refer to FIG. 13, and the method includes the following steps.

S100: while a video call is displayed on a first call interface in a full screen, upon receiving an input operation for a window switch control on the first call interface, an instruction for switching to a small window is generated. The first call interface includes at least one call window.

In some embodiments, in addition to selecting the window switch control on the first call interface to generate the instruction for switching the full screen to the small window, the instruction for switching the full screen to the small window may also be activated by clicking a specific key on the remote controller, or the instruction for switching the full screen to the small window may be passively activated by responding to other events associated with page presentation. In some embodiments of the present disclosure, the events that start other pages include that: a framework layer detects that a user initiates DLNA (digital living network alliance) screencast, switches signal sources, clicks the home key to enter the Launcher, or enters a page by clicking a notification.

The window switch control is a control which can be visible and invisible. In some embodiments, after entering a full-screen call, the first call interface displays the window switch control, and a layer where the window switch control is located is above a layer where the call window is located. If there is no operation within a preset time, the layer where the window switch control is located is canceled or the layer where the window switch control is located is set to be invisible, so as to hide the window switch control. Upon receiving an input from the user, the layer where the window switch control is located is restarted to display the window switch control.

S200: in response to the instruction for switching the full screen to the small window, the first call interface is switched to a second call interface displayed in a first floating layer, and the television interface before accepting the video call is displayed in the video layer below the second call interface.

In some embodiments, the television interface before the video call is configured to be able to obtain the focus, the call window on the second call interface is configured not to be able to obtain the focus, and the size of the call window on the second call interface is smaller than the size of the call window on the first call interface.

In some embodiments, the form of the full screen refers to a display form in which the video windows of the parties involved in the video call are presented on the first call interface according to a preset arrangement rule, and the first call interface is a frontend page.

In some embodiments, the form of the floating layer refers to a display form in which the video windows of the parties involved in the video call are presented on the second call interface according to a preset arrangement rule, the second call interface is a non-frontend page, the second call interface is an interface located in the floating layer, and the size of a single video window on the second call interface is smaller than the size of a single video window in the first call interface. In some embodiments, the floating layer may be an OSD (on-screen display) floating layer.

In some embodiments, upon receiving the instruction for switching the window, the controller starts the floating layer to draw the second call interface. The second call interface has windows corresponding to calls participants. For example, two windows are arranged for two participants in the call, and three windows are arranged for three participants in the call. Meanwhile, the output of the image data of the video layer is canceled, and the call video data is output to the window in the floating layer. The first call interface is canceled.

Figure 14:
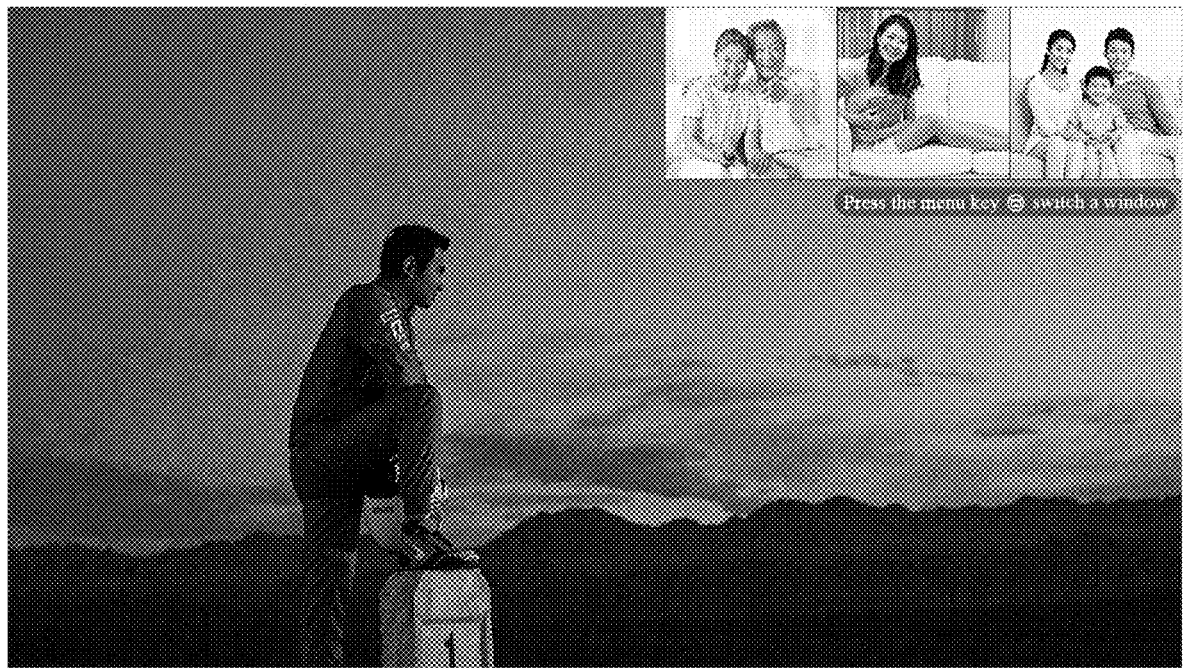
FIG. 14 illustrates a schematic diagram of a foreground interface switched to a second call interface according to an embodiment.

When a full-screen call is resumed, the controller starts the first call interface of the video layer. Windows corresponding to call participants s are arranged on the first call interface, e.g., two windows are arranged for two participants in the call, and three windows are arranged for three participants in the call. Meanwhile, the second call interface is canceled, and the call video data is output to the window in the first call interface. In some embodiments, the first call interface and the second call interface both have several call windows, the several call windows on the first call interface are distributed on the first call interface, and the call windows on the first call interface are reduced in proportion to the call windows on the second call interface in area. Alternatively, several call windows on the second call interface are arranged on an upper side or other sides of the second call interface to avoid the middle area of the display screen, so as to be convenient for a user to view. A foreground page switched to the second call interface is as shown in FIG. 14.

Figure 17:
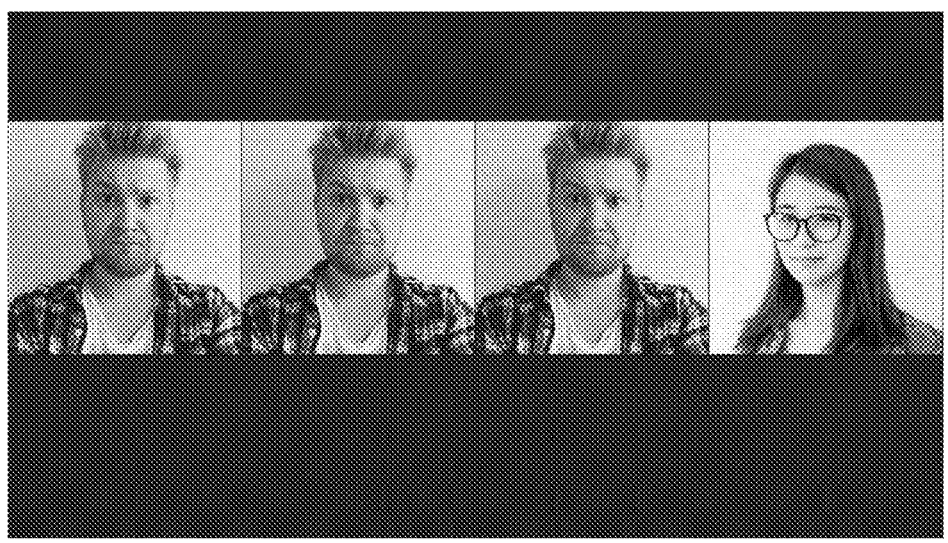
FIG. 17 illustrates a layout diagram of a call window of a first call interface according to another embodiment.

In some embodiments, the first call interface of the different number of call participants is as shown in FIG. 15 to FIG. 17. The user's view experience may be improved through the horizontally expanded layout.

The call window on the second call interface is configured that a focus cannot be obtained. That is, when a user clicks or selects a key or option displayed on the foreground page, the call window on the second call interface will not respond, while the keys or options on the foreground page located on the lower layer of the second call interface can be activated by the user. In this way, all the operations on the foreground page at the lower layer of the second call interface can be realized. For example, when a video is being played on the foreground page at the lower layer of the second call interface, the user wants to click a "Close" key in the upper-right corner of the video playing page by operating the remote controller to close the page that is playing the video. The call window on the second call interface may be arranged in the upper-right corner, the "Close" key will be shielded. However, because the call window on the second call interface is configured that a focus cannot be obtained, when a user selects the upper-right corner through the remote controller, the call window will not be selected, and the selected one is the window for closing, and thus, the user can operate the foreground page on the lower layer as if there is no second call interface.

In some embodiments of the present disclosure, the first call interface displayed in the form of the full screen is switched to the second call interface displayed in the form of the floating layer, which does not influence the operation on the foreground page at the lower layer of the second call interface at all, thereby achieving "chatting while watching", "chatting while playing", etc.

"Chatting while watching" in some embodiments of the present disclosure means that a user can make a video chat with at least one other user while watching a video program. The presentation of the video program may be used as a background screen, and the video chat window is displayed above the background screen. The user may play chess and card games with at least one other user while chatting. The presentation of the game interface may be used as the background screen, and the video chat window is displayed above the background screen. Visually, this function is called "chatting while playing".

In some embodiments, "chatting while watching" may also be a state that a homepage or other applications can be presented while a user is chatting, so that the user can operate the homepage or other applications.

In some embodiments, the method further includes: in response to a message for joining the call, a new call window is created based on the message; and the new call window is added to the currently displayed first call interface or second call interface.

In some embodiments, the method further includes: in response to a message for exiting the call from a call participant, the call window corresponding to the call participant, on the currently displayed first call interface or the second call interface is removed.

In some embodiments, the step that the first call interface is switched to a second call interface displayed in the form of a floating layer, and a television interface before accepting the video call is displayed in a video layer below a second call interface includes the following: in response to the application corresponding to the television interface before the video call being installed in a first chip of the television, creating the second call interface including the second call window to move the video data of the call window on the first call interface to the second call window, and an event associated with the television interface before initiating the video call is transmitted to the first chip to continue displaying the television interface before the video call. The method further includes: in response to the application being in the second chip, creating the second call interface including the second call window to move the video data of the call window on the first call interface to the second call window, and the second chip is caused to control the display to continue displaying the television interface before the video call.

In some embodiments, the step that the first call interface displayed in the form of a full screen is switched to a second call interface displayed in the form of a floating layer, and a television interface before the video call is displayed on the foreground page includes the following: determining the location of the application corresponding to the television interface before the video call, where the location of the application includes the chip A or the chip N. If the application is located in the chip A, the first call interface is pulled to the background, the second call interface is created at the foreground, the call window on the first call interface is moved to the second call interface, an event for initiating the foreground interface is transmitted, and the application interface before the video call continues to display at the foreground.

In some embodiments of the present disclosure, the smart television includes the chip A and the chip N. The application operations in the chip A and the chip N do not influence each other. When the application corresponding to the television interface before the video call is in the chip A, for the interface resuming in the chip A, an event for initiating the foreground interface needs to be transmitted, and the foreground interface will continue to display the application interface before the video call. For example, before the video call is initiated, the foreground interface of the smart television is playing a video, and the video playing application is located in the chip A. Since the video playing application is not located in the same chip as the chip N where the video call is located, the event for initiating the foreground interface is transmitted to continue to play the video.

In some embodiments, the method further includes: if the application is located in the chip N, the first call interface is pulled to the background, the second call interface is established in the foreground, the call window on the first call interface is moved to the second call interface, and the application interface in the original background is pulled to the foreground to continue to display.

In some embodiments of the present disclosure, if the application corresponding to television interface before the video call is in the chip N, the television interface before the video call is resumed, and the application interface in the background is pulled to the foreground to continue to display. For example, before the video call is initiated, the foreground interface of the smart television is playing a video, and the video playing application is located in the chip N. When the calling interface or the called interface is started, the video playing application exits to the background. Thus, when all the call windows on the first call interface are transferred to the second call interface, a video playing application interface in the background is pulled to the foreground to continue to play a video.

In some embodiments, the step that the first call interface displayed in the form of the full screen is switched to a second call interface displayed in the form of a floating layer includes: the first call interface exits to the background, a full-screen transparent floating layer is created at the foreground, and whether there is a call widow on the first call interface is determined; and if there is a call window on the first call interface, the call window of the first call interface is moved to the second call interface, and then whether there is a call window on the first call interface is determined again until it is determined there is no call window in the first call interface; and if there is no call window in the first call interface, the switching is completed.

It should be noted that in some embodiments of the present disclosure, the call windows on the first call interface are put into the second call interface one by one, and the switching is completed when all of the call windows on the first call interface are moved to the second call interface.

In some embodiments, the step that if there is a call window on the first call interface, the call window of the first call interface is moved to the second call interface includes: if there is a call window on the first call interface, whether there is a call window on the second call interface is determined; if there is no call window on the second call interface, the call window of the first call interface is moved to an upper-right position of the second call interface; and if there is a call window on the second call interface, the call window on the first call interface is moved to the left-most position of the call window on the second call interface.

It should be noted that the upper-right position and the left-most position in some embodiments of the present disclosure are only examples of the present disclosure. Any method that can make the call windows of the second call interface convenient for the user to view is acceptable. Embodiments of the present disclosure do not intend to limit positions of the call windows on the second call interface some.

In some embodiments, after the first call interface is switched to the second call interface displayed in the form of a floating layer, the method further includes: a preset key value transmitted from the remote controller is received; while the second call interface is being displayed, an instruction for switching a small window to a full screen is generated according to the preset key value; and in response to the instruction for switching the small window to the full screen, the second call interface is switched to the first call interface.

It should be noted that the call window on the second call interface in some embodiments of the present disclosure cannot obtain the focus, and thus, the instruction for switching the small window to the full screen can only be transmitted by triggering a special key on the remote controller. In some embodiments of the present disclosure, the step that the second call interface displayed in the form of a floating layer is switched to the first call interface displayed in the form of a full screen includes: the first call interface at the background is pulled to the foreground; the call windows of the second call interface and the second call interface are all removed; the layout of the first call interface is determined according to the number of call windows; and the call windows are sequentially added to the first call interface according to the layout of the first call interface.

In some embodiments, the method further includes: an instruction for switching a full screen to a small window is input from a user, when pressing a specific key on the remote controller; the key value of the specific key on the remote controller is monitored, a broadcast is transmitted, and the current interface state is determined, where the current interface state includes the first call interface and the second call interface; if the current active interface is the first call interface, when pressing the specific key on the remote controller, the instruction for switching the full screen to the small window will be generated; and if the current active interface is the second call interface, when pressing the specific key on the remote controller, the instruction for switching the small window to the full screen will be generated.

It should be noted that in practical applications, when a video call is made, the specific key is used to trigger a switch instruction, and the switch instruction includes an instruction for switching a full screen to a small window and an instruction for switching a small window to a full screen.

While the video call is in process, specific keys are monitored, key values are transmitted. In some embodiments of the present disclosure, when the first call interface displayed in the form of a full screen is completed, the second call interface displayed in the form of a floating layer is about to switch, and the current interface status is marked as a small window. Therefore, when the specific key is monitored and the key value is transmitted, a broadcast is transmitted, and if the marked state is the small window, the instruction for switching the small window to the full screen is generated; and if there is no marked state of the small window, the instruction for switching the full screen to the small window is generated.

In some embodiments, after receiving the key value from the remote controller, the method further includes: a switch instruction is generated on a second floating layer when the second call interface is not displayed.

In some embodiments, since the call window on the second call interface in some embodiments of the present disclosure cannot obtain the focus, only a specific key on the remote controller can be used to trigger the instruction for switching the small window to the full screen. In order to enable the keys on the remote controller to have multiple functions and avoid unnecessary keys, in some embodiments of the present disclosure, some specific keys are set as multiplexed keys. When a video call is made, a switch instruction can be triggered by pressing the specific key. In addition to being set to trigger the switch instruction, the specific key in the present disclosure can also be set to trigger other instructions for controlling the smart television.

In some embodiments of the present disclosure, a user may join or exit from a video call when the video call is made. If a member of the video call invites other users to join the video chat, after sending an invitation and receiving the information associated with the user being the invited, when the current active interface is the first call interface, the call windows on the first call interface will be rearranged according to the updated number of participants in the call, and a new call window is added in the first call interface. When the current active interface is the second call interface, a new call window is added to the second call interface. Alternatively, the new call window is added on the left side of the original call window.

If a call participant of the video call exits the video call and the current active interface is the first call interface, the call window in the first call interface will be rearranged according to the updated number of participants in the call, and the call window is removed from the first call interface. When the current active interface is the second call interface, the call window is removed from the second call interface. Alternatively, the call window on the left side of the removed call window is moved to the right side.

According to different number of participants in the call, the layout of the call window in the first call interface is as shown in FIG. 15 to FIG. 17.

When the video call is ended, the current active interface is the first call interface, and the first call interface will exit directly. When the application corresponding to the television interface before the video call is in the chip N, an application at the background is returned to the foreground. When the application corresponding to the television interface before the video call is in the chip A which is same as the application when the video call is being made, only the first call interface exits.

When the current active interface is the second call interface, since the call window on the second call interface is configured not to be able to obtain the focus, the second call interface can be removed only after all the other call participants hang up the video call, and the video call is ended.

After the video call is ended, the following operations will be performed: a message for ending a call in call signaling layer is transmitted, the microphone of the smart television is switched back to the state before the video call, the screen saver is unlocked, and the broadcast is transmitted; resources such as an audio and video push streams and pull streams and rings that are currently being loaded are released; and specific key event monitoring is stopped.

Some embodiments of the present disclosure provide another method for switching a video call interface on a smart television, including:

receiving a preset key value transmitted from a remote controller;

while a second video call window is displayed in a floating layer, in response to the preset key value, canceling a second video call window, and displaying, in a full screen in a video layer, a first call interface including a first video call window, where the first video call window and the second video call window are both used to display image data of a video call; and while the second video call window is not displayed in the floating layer, in response to the preset key value, displaying a preset interface corresponding to the preset key value, where the preset interface is different from the first call interface.

Some embodiments of the present disclosure provide another method for switching a video call interface on a smart television, including:

while a first video is being played on a video layer, in response to a call invitation message, displaying a call invitation interface on a floating layer above the video layer, where the call invitation interface includes an invitation accepting control and an invitation declining control;

receiving a user's operation on the invitation accepting control;

displaying a video call on the first call interface in a full screen, where the first call interface includes a first video call window arranged on the video layer and used for displaying image data of the video call, and a control arranged on the floating layer, where the control includes a small window switch control and configured to be invisible under a predefined condition;

receiving a user's operation on the control; and controlling to cancel the first call interface, displaying the image data of the video call in a second video call window of a second call interface on the floating layer, and continuing to play the first video on the video layer, where a position except for a region of the second video call window on the second call interface is set to be transparent, and the second call interface is configured that a focus cannot be obtained.

In some embodiments, the floating layer where the control is located and the floating layer where the second call interface is located are different floating layers.

Some embodiments of the present disclosure provide another method for switching a video call interface on a smart television, including:

in response to a call invitation message, displaying a call invitation interface above a current interface, where the call invitation interface includes an invitation accepting control and an invitation declining control;

in response to receiving an operation on the invitation accepting control, answering the video call, and displaying a video call on a first call interface in a full screen, where the first call interface includes an end-call control and a small window switch control;

receiving a key value transmitted from a remote controller, and in response to the video call currently being displayed in a full screen, generating an instruction for switching a full screen to a small window; and in response to the instruction for switching the full screen to the small window, switching the first call interface in a full screen to a second call interface in the form of a floating layer, and displaying a television interface before the video call below the second call interface, where the television interface before the video call is configured to be able to obtain a focus, a call window on the second call interface is configured not to be able to obtain a focus, and the call window on the second call interface is obtained by reducing the call window on the first call interface according to an area ratio.

It can be seen from the above embodiments that the present disclosure provides a method for switching a video call interface on a smart television. In the method, the first call interface displayed in the form of a full screen is switched to the second call interface displayed in the form of a floating layer, and the call window on the second call interface is configured that a focus cannot be obtained; and when a user operates the foreground page, the call window on the second call interface will not be selected, while keys or options of the foreground page located on the lower layer of the second call interface can all be clicked by the user. In this way, all the operations on the foreground page located on the lower layer of the second call interface can be implemented, such that a plurality of functions of the smart television can be operated simultaneously without causing a waste of resources.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A smart television, comprising:
a display; and
a remote controller configured to have a plurality of keys, wherein a first key of the plurality of keys is configured to associate with a first instruction in a first context and a second instruction in a second context, the first instruction is different from the second instruction, and the first context is different from the second context;
a communicator configured to receive signals from the remote controller; and
a controller in connection with the display and the communicator; wherein the controller is configured to:
display a first call interface in a full screen on a video layer during a video call between the smart television and another electronic device; wherein the first call interface comprises at least one call window;
receive a selection on a small window switch control on the first call interface, and generate an instruction for switching a full screen to a small window; and
in response to the instruction for switching the full screen to the small window, cancel the first call interface, display a television interface before the video call on the video layer, start a first floating layer above the video layer to draw a second call interface, the second call interface having same number of call window as the first call interface, display the second call interface on the first floating layer above the video layer to make the video call, cancel output of call video data on the video layer, and output the call video data to at least one call window on the first floating layer,
wherein the video layer is configured to be able to acquire a focus, the second call interface is configured not to be able to acquire the focus and configured to be unresponsive to user's click or selection thereon and only respond to a key event from the remote controller, and the at least one call window in the second call interface is smaller in size than the at least one call window in the first call interface;
wherein the controller is further configured to:
while the second call interface is being displayed, receive a preset key value from the first key on the remote controller, and generate the first instruction for switching the small window to the full screen associated with the first key;
in response to the first instruction for switching the small window to the full screen, cancel the second call interface displayed currently and the television interface before the video call, pull the first call interface from background of the display device to foreground of the display device, and present the first call interface on the display;
wherein the controller is further configured to:
receive the preset key value from the first key on the remote controller; and
in response to the second call interface being not currently displayed, generate the second instruction associated with the first key.

2. The smart television according to claim 1, wherein the controller comprises a first controller and a second controller, the second controller is connected with the display, and the first controller is connected with the display through the second controller;
the second controller is configured to receive the selection on the small window switch control on the first call interface, and generate the instruction for switching the full screen to the small window; and
the second controller is further configured to:
determine a location of an application corresponding to the television interface before the video call;
when the application corresponding to the television interface before the video call is in the first controller, display the second call interface comprising the at least one call window on the first floating layer above the video layer to make the video call, and display the television interface before the video call on the video layer received from the first controller; and
when the application corresponding to the television interface before the video call is in the second controller, display the second call interface comprising the at least one call window on the first floating layer above the video layer to make the video call, and invoke the application corresponding to the television interface before the video call to display the television interface before the video call on the video layer.

3. The smart television according to claim 2, wherein the second controller is further configured to:
transmit an event associated with the television interface before initiating the video call to the first controller, to make the first controller transmit the television interface before the video call to the second controller;
receive the television interface before the video call; and
display the television interface before the video call on the video layer.

4. The smart television according to claim 1, wherein a size of the call window on the second call interface is smaller than a size of the call window on the first call interface.

5. The smart television according to claim 1, wherein the controller is further configured to:
while a first video is being played on the video layer, in response to a call invitation message, display a call invitation interface on the floating layer above the video layer; wherein the call invitation interface comprises an invitation accepting control and an invitation declining control;
receive a user's selection on the invitation accepting control;

display the video call on the first call interface in the full screen.

6. The smart television according to claim 5, wherein the first call interface comprises: a first video call window arranged on the video layer and used for displaying image data of the video call, and a switch control arranged on the floating layer; wherein the switch control comprises the small window switch control and is configured to be invisible to the user under a predefined condition;
wherein the controller is further configured to:
receive a user's selection on the small window switch control; and
control to cancel the first call interface, display the image data of the video call in the second video call window of the second call interface on the floating layer, and continue to play the first video on the video layer;
wherein a position except for a region of the second video call window on the second call interface is set to be transparent.

7. A method for processing video call, comprising:
displaying a first call interface in a full screen on a video layer during a video call between a local smart television and another electronic device; wherein the first call interface comprises at least one call window;
receiving an input selection on a small window switch control on the first call interface, and generating an instruction for switching a full screen to a small window; and
in response to the instruction for switching the full screen to the small window, cancelling the first call interface, displaying a television interface before the video call on the video layer, starting a first floating layer above the video layer to draw a second call interface, the second call interface having same number of call window as the first call interface, displaying the second call interface on the first floating layer above the video layer to make the video call, canceling output of call video data on the video layer, and outputting the call video data to at least one call window on the first floating layer,
wherein the video layer is configured to be able to acquire a focus, the second call interface is configured not to be able to acquire the focus and configured to be unresponsive to user's click or selection thereon and only respond to a key event from a remote controller, and the at least one call window in the second call interface is smaller in size than the at least one call window in the first call interface;
wherein the remote controller is configured to have a plurality of keys, a first key of the plurality of keys is configured to associated with a first instruction in a first context and a second instruction in a second context, the first instruction is different from the second instruction, and the first context is different from the second context;
wherein the method further comprises:
while the second call interface is being displayed, receiving a preset key value from the first key on the remote controller, and generating the first instruction for switching the small window to the full screen associated with the first key; and
in response to the first instruction for switching the small window to the full screen, canceling the second call interface displayed currently and the television interface before the video call, pulling the first call interface from background of the display device to foreground of the display device, and presenting the first call interface on the display;
receiving the preset key value from the first key on the remote controller; and
in response to the second call interface being not currently displayed, generating the second instruction associated with the first key.

8. The method according to claim 7, comprising:
determining, by a second controller of the local smart television, a location of an application corresponding to the television interface before the video call;
when the application corresponding to the television interface before the video call is in a first controller of the local smart television, displaying the second call interface comprising the at least one call window on the first floating layer above the video layer to make the video call, and displaying the television interface before the video call on the video layer received from the first controller; and
when the application corresponding to the television interface before the video call is in a second controller of the smart television, displaying the second call interface comprising the at least one call window on the first floating layer above the video layer to make the video call, and invoking the application corresponding to the television interface before the video call to display the television interface before the video call on the video layer.

9. The method according to claim 8, comprising:
transmitting, by the second controller of the local smart television, an event associated with the television interface before initiating the video call to the first controller, to make the first controller transmit the television interface before the video call to the second controller;
receiving, by the second controller of the local smart television, the television interface before the video call; and
displaying, by the second controller of the local smart television, the television interface before the video call on the video layer.

10. The method according to claim 7, wherein:
a size of the call window on the second call interface is smaller than a size of the call window on the first call interface.

11. The method according to claim 7, comprising:
while a first video is being played on the video layer, in response to a call invitation message, displaying a call invitation interface on the floating layer above the video layer; wherein the call invitation interface comprises an invitation accepting control and an invitation declining control;
receiving a user's selection on the invitation accepting control; and
displaying the video call on the first call interface in the full screen.

12. The method according to claim 11, wherein the first call interface comprises: a first video call window arranged on the video layer and used for displaying image data of the video call, and a switch control arranged on the floating layer; wherein the switch control comprises the small window switch control and is configured to be invisible to the user under a predefined condition;
wherein the method further comprises:
receiving the user's selection on the small window switch control; and cancelling the first call interface, displaying the image data of the video call in the second video call window of the second call interface on the floating layer, and continuing to play the first video on the video layer;

wherein a position except for a region of the second video call window on the second call interface is set to be transparent.

* * * * *